US011702066B2

(12) United States Patent
Golston et al.

(10) Patent No.: US 11,702,066 B2
(45) Date of Patent: Jul. 18, 2023

(54) SYSTEMS AND METHODS FOR OPERATING A VEHICLE BASED ON SENSOR DATA

(71) Applicant: QUALCOMM Incorporated, San Diego, CA (US)

(72) Inventors: Jeremiah Golston, San Diego, CA (US); Michel Adib Sarkis, San Diego, CA (US); Mainak Biswas, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 383 days.

(21) Appl. No.: 15/636,409

(22) Filed: Jun. 28, 2017

(65) Prior Publication Data
US 2018/0251122 A1     Sep. 6, 2018

Related U.S. Application Data

(60) Provisional application No. 62/465,663, filed on Mar. 1, 2017.

(51) Int. Cl.
*B60W 30/02* (2012.01)
*B60W 50/00* (2006.01)
(Continued)

(52) U.S. Cl.
CPC .......... *B60W 30/025* (2013.01); *B60W 40/02* (2013.01); *B60W 40/08* (2013.01);
(Continued)

(58) Field of Classification Search
CPC .... B60W 30/025; B60W 40/02; B60W 40/08; B60W 50/0098; B60W 2050/0075;
(Continued)

(56) References Cited

U.S. PATENT DOCUMENTS 8,527,146 B1 *  9/2013  Jackson ............ B60W 50/0098
                                                    180/287
2003/0125855 A1   7/2003  Breed et al.
(Continued)

FOREIGN PATENT DOCUMENTS

CN          103991419 A      8/2014
WO    WO-2016083662 A1 *    6/2016

OTHER PUBLICATIONS

Perrett T., et al., "Visual Monitoring of Driver and Passenger Control Panel Interactions", IEEE Transactions on Intelligent Transportation Systems, vol. 18, No. 2, Feb. 2017, pp. 321-331.
(Continued)

*Primary Examiner* — Muhammad Shafi
(74) *Attorney, Agent, or Firm* — QUALCOMM Incorporated

(57) ABSTRACT

A method performed by an electronic device is described. The method includes obtaining sensor data corresponding to multiple occupants from an interior of a vehicle. The method also includes obtaining, by a processor, at least one occupant status for at least one of the occupants based on a first portion of the sensor data. The method further includes identifying, by the processor, at least one vehicle operation in response to the at least one occupant status. The method additionally includes determining, by the processor, based at least on a second portion of the sensor data, whether to perform the at least one vehicle operation. The method also includes performing the at least one vehicle operation in a case that it is determined to perform the at least one vehicle operation.

30 Claims, 13 Drawing Sheets

(51) Int. Cl.
*B60W 40/02* (2006.01)
*B60W 40/08* (2012.01)
(52) U.S. Cl.
CPC . *B60W 50/0098* (2013.01); *B60W 2040/0809* (2013.01); *B60W 2050/009* (2013.01); *B60W 2050/0075* (2013.01); *B60W 2420/42* (2013.01); *B60W 2540/00* (2013.01)
(58) Field of Classification Search
CPC ......... B60W 2540/00; B60W 2420/42; B60W 2050/009; B60W 2040/0809
USPC .......................................................... 701/23
See application file for complete search history.

(56) References Cited

U.S. PATENT DOCUMENTS

| | | | |
|---|---|---|---|
| 2010/0241309 | A1 | 9/2010 | Demirdjian et al. |
| 2011/0137520 | A1* | 6/2011 | Rector .............. H04M 1/72577 701/36 |
| 2014/0223384 | A1 | 8/2014 | Graumann |
| 2015/0032328 | A1* | 1/2015 | Healey ................... B60Q 1/503 701/36 |
| 2015/0039312 | A1* | 2/2015 | Tzirkel-Hancock ........................ G10L 15/222 704/246 |
| 2015/0246673 | A1* | 9/2015 | Tseng ................... B60W 30/00 701/23 |
| 2015/0286952 | A1 | 10/2015 | El Dokor et al. |
| 2016/0264131 | A1 | 9/2016 | Chan et al. |
| 2016/0314447 | A1* | 10/2016 | Trevathan .......... G06Q 30/0609 |
| 2016/0352663 | A1* | 12/2016 | Hopkins .............. H04L 51/226 |
| 2017/0225677 | A1* | 8/2017 | Yoshida .............. A61B 5/6893 |

OTHER PUBLICATIONS

International Search Report and Written Opinion—PCT/US2018/012769—ISA/EPO—dated May 7, 2018.

* cited by examiner

SYSTEMS AND METHODS FOR OPERATING A VEHICLE BASED ON SENSOR DATA

RELATED APPLICATION

This application is related to and claims priority to U.S. Provisional Patent Application Ser. No. 62/465,663, filed Mar. 1, 2017, for "SYSTEMS AND METHODS FOR OPERATING A VEHICLE BASED ON INTERIOR SENSOR DATA."

FIELD OF DISCLOSURE

The present disclosure relates generally to electronic devices. More specifically, the present disclosure relates to systems and methods for operating a vehicle based on sensor data.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform new functions, perform richer functions, and/or that perform functions faster, more efficiently, and/or more reliably are often sought after.

Advances in technology have resulted in smaller and more powerful electronic devices. For example, there currently exist a variety of electronic devices such as cellular phones, smartphones, vehicle in-dash electronics, laptop computers, servers, etc.

Users often value convenience, flexibility, and a customized experience from vehicles. However, vehicle functions are limited and may not provide a convenient experience. As can be observed from this discussion, improving user experience and/or convenience may be beneficial.

SUMMARY

A method performed by an electronic device is described. The method includes obtaining sensor data corresponding to multiple occupants from an interior of a vehicle. The method also includes obtaining, by a processor, at least one occupant status for at least one of the occupants based on a first portion of the sensor data. The method further includes identifying, by the processor, at least one vehicle operation in response to the at least one occupant status. The method additionally includes determining, by the processor, based at least on a second portion of the sensor data, whether to perform the at least one vehicle operation. The method further includes performing the at least one vehicle operation in a case that it is determined to perform the at least one vehicle operation. The method may include fusing the sensor data from the interior of the vehicle with sensor data from an exterior of the vehicle.

The first portion of the sensor data may correspond to a first occupant and the second portion of the sensor data may correspond to a second occupant. Determining whether to perform the at least one vehicle operation may be based on an occupant status of the second occupant. Determining whether to perform the at least one vehicle operation may be based on a priority for the second occupant. Determining a priority for the first occupant and the second occupant may include prioritizing the first occupant or the second occupant based on at least one of vehicle ownership or guest status. Determining a priority for the first occupant and the second occupant may be based at least on a difference between a status of the first occupant and a desired status of the first occupant. It may be determined to perform the at least one vehicle operation in a case that the at least one vehicle operation corresponds to an occupant with a priority that is higher than each priority of one or more other occupants.

The method may include determining to perform the at least one vehicle operation in a case that performing the vehicle operation corresponding to an occupant with a priority does not violate any preference corresponding to any other occupant with a higher priority. The method may also include determining to not perform the at least one vehicle operation in a case that performing the vehicle operation corresponding to the occupant with the priority violates any preference corresponding to any other occupant with a higher priority.

Obtaining the at least one occupant status may include measuring an occupant state with machine learning. Obtaining the at least one occupant status may also include obtaining an occupant state command. Obtaining the at least one occupant status may further include combining the measured occupant state and the obtained occupant state command to produce the occupant status. Obtaining the at least one occupant status may include determining, for one or more of the occupants, a temperature comfort level, a riding anxiety level, a safety level, a health level, a possessions status, an activity, or a plan status.

An electronic device is also described. The electronic device includes a memory. The electronic device also includes a processor coupled to the memory. The processor is configured to obtain sensor data corresponding to multiple occupants from an interior of a vehicle. The processor is also configured to obtain at least one occupant status for at least one of the occupants based on a first portion of the sensor data. The processor is further configured to identify at least one vehicle operation in response to the at least one occupant status. The processor is additionally configured to determine, based at least on a second portion of the sensor data, whether to perform the at least one vehicle operation. The processor is also configured to perform the at least one vehicle operation in a case that it is determined to perform the at least one vehicle operation.

A non-transitory tangible computer-readable medium storing computer executable code is also described. The computer-readable medium includes code for causing an electronic device to obtain sensor data corresponding to multiple occupants from an interior of a vehicle. The computer-readable medium also includes code for causing the electronic device to obtain at least one occupant status for at least one of the occupants based on a first portion of the sensor data. The computer-readable medium further includes code for causing the electronic device to identify at least one vehicle operation in response to the at least one occupant status. The computer-readable medium additionally includes code for causing the electronic device to determine, based at least on a second portion of the sensor data, whether to perform the at least one vehicle operation. The computer-readable medium also includes code for causing the electronic device to perform the at least one vehicle operation in a case that it is determined to perform the at least one vehicle operation.

An apparatus is also described. The apparatus includes means for obtaining sensor data corresponding to multiple occupants from an interior of a vehicle. The apparatus also includes means for obtaining at least one occupant status for at least one of the occupants based on a first portion of the sensor data. The apparatus further includes means for identifying at least one vehicle operation in response to the at least one occupant status. The apparatus additionally includes means for determining, based at least on a second portion of the sensor data, whether to perform the at least one vehicle operation. The apparatus also includes means for performing the at least one vehicle operation in a case that it is determined to perform the at least one vehicle operation.

DETAILED DESCRIPTION

Figure 1:
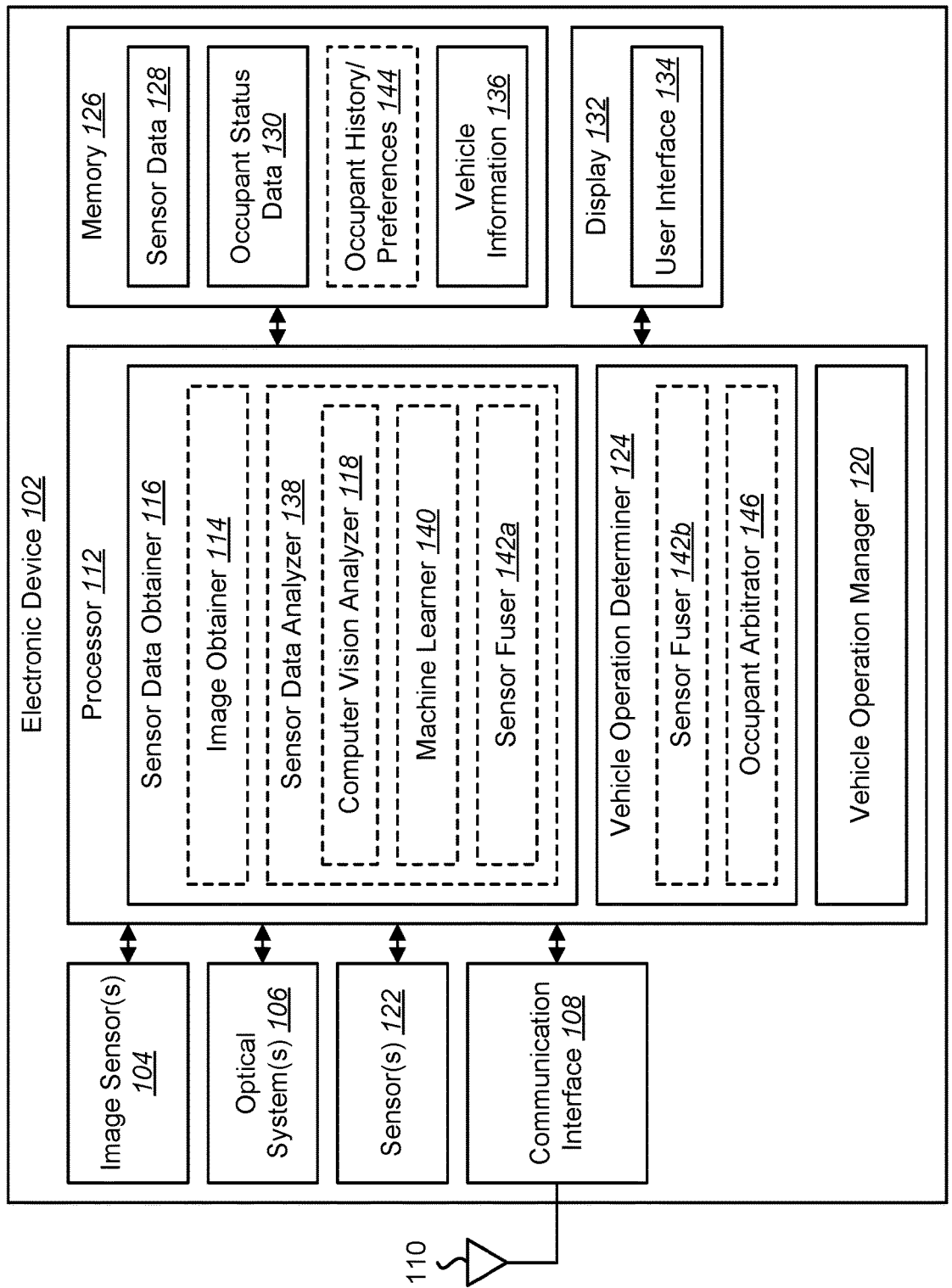
FIG. 1 is a block diagram illustrating one example of an electronic device in which systems and methods for operating a vehicle based on sensor data may be implemented.

Some configurations of the systems and methods disclosed herein may relate to operating a vehicle based on sensor data. For example, some configurations may provide a virtual chauffeur via in-cabin situation awareness. This deals with improving the experience of occupants (e.g., a driver and/or one or more other occupants) in a manually driven vehicle, in a self-driving vehicle and/or in a self-driving ride share vehicle. Accordingly, some configurations of the systems and methods disclosed herein may be implemented by vehicle original equipment manufacturers (OEMs), self-driving vehicle services, and/or fleet monitoring services.

Using a set of sensors, some configurations may create and maintain full situational awareness inside the vehicle (e.g., car, truck, etc.). The situational awareness may include the state of the occupant(s), which may be utilized to fulfill one or more operations automatically instead of relying on a human driver/chauffeur. For example, vehicle operations may include maintaining the comfort of occupant(s) and making adjustments to travel plans based on changes in circumstances. Some configurations may enable the vehicle to detect occupant status (e.g., occupant states) and/or situations and act accordingly so that the overall experience and driving environment is safe and comfortable. A variety of examples is provided in connection with one or more of the Figures.

One or more sensors may be utilized to enable full situational awareness. In a vehicle layout, for instance, one or more sensors may be utilized to monitor the trunk of the vehicle, the front, the middle (if applicable), and the back row seats, including floorboard areas. An example of sensors in a vehicle is given in connection with FIG. 3. It should be noted that other designs (e.g., some self-driving vehicles) may be easier to monitor by being arranged with seating in a circular fashion instead of rows. For example, this may make it easier to monitor the entire in-car cabin with an array of cameras and sensors. A variety of combinations of sensors are possible. In a case of multiple occupants, some configurations may either hand-off states between occupants (e.g., from passenger to driver or from driver to passenger, etc.) and/or may choose the most suitable occupant to accommodate via some voting, for example.

Some configurations of the systems and methods disclosed herein may involve object detection, object recognition, and/or machine learning. Some configurations may be implemented in the automotive context (e.g., manually driven vehicles, driver-assisted vehicles, self-driving vehicles, vehicle services, etc.). Some configurations may provide navigation, occupant comfort, safety, and/or security. For example, some configurations may recognize that an occupant (e.g., driver or passenger) has left something (e.g., a possession, a belonging, etc.) in the vehicle. Some configurations may monitor a child that is left in car while a parent has gone into a store. Some configurations may monitor an occupant health state.

While some of the concepts described herein may be useful in the self-driving vehicle context, it should be noted that some of the concepts may be useful before in other contexts (e.g., manually-driven vehicles, connected homes, elderly care, etc.).

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one example of an electronic device 102 in which systems and methods for operating a vehicle based on sensor data may be implemented. Examples of the electronic device 102 include computers (e.g., embedded computers, integrated computers, desktop computers, laptop computers, etc.), servers, vehicles (e.g., cars, trucks, aircraft, motorcycles, etc.), automobiles, in-dash electronics, tablet devices, smart phones, cameras, video camcorders, digital cameras, personal cameras, action cameras, surveillance cameras, mounted cameras, connected cameras, robots, aircraft, gaming consoles, personal digital assistants (PDAs), etc. The electronic device 102 may include one or more components or elements. One or more of the components or elements may be implemented in hardware (e.g., circuitry), a combination of hardware and software (e.g., a processor with instructions), and/or a combination of hardware and firmware.

In some configurations, the electronic device 102 may include a processor 112, a memory 126, a display 132, one or more image sensors 104 and/or other sensors 122, one or more optical systems 106, and/or a communication interface 108. The processor 112 may be coupled to (e.g., in electronic communication with) the memory 126, display 132, image sensor(s) 104, optical system(s) 106, sensor(s) 122, and/or communication interface 108. It should be noted that one or more of the elements illustrated in FIG. 1 may be optional. In particular, the electronic device 102 may not include one or more of the elements illustrated in FIG. 1 in some configurations. For example, the electronic device 102 may or may not include an image sensor 104 and/or optical system 106. Additionally or alternatively, the electronic device 102 may or may not include a display 132.

In some configurations, the electronic device 102 may present a user interface 134 on the display 132. For example, the user interface 134 may enable a user to interact with the electronic device 102. In some configurations, the display 132 may be a touchscreen that receives input from physical touch (by a finger, stylus, or other tool, for example). Additionally or alternatively, the electronic device 102 may include or be coupled to another input interface. For example, the electronic device 102 may include a camera facing a user and may detect user gestures (e.g., hand gestures, arm gestures, eye tracking, eyelid blink, etc.). In another example, the electronic device 102 may be coupled to a mouse and may detect a mouse click. In yet another example, the electronic device 102 may be coupled to a keyboard and may receive key inputs from the keyboard. In some configurations, one or more of the images described herein may be presented on the display 132 and/or user interface 134. In some configurations, additional or alternative input means may be implemented. For example, the electronic device 102 may include and/or be coupled to one or more microphones, buttons, knobs, dials, etc. In some approaches, the microphone(s) may be utilized to capture an audio signal (e.g., speech), which may be recognized to determine one or more inputs and/or commands.

The communication interface 108 may enable the electronic device 102 to communicate with one or more other electronic devices. For example, the communication interface 108 may provide an interface for wired and/or wireless communications. In some implementations, the electronic device 102 may communicate directly or indirectly (via a network, for instance) with a server device, with a client device, and/or with a vehicle. In some configurations, the communication interface 108 may be coupled to one or more antennas 110 for transmitting and/or receiving radio frequency (RF) signals. Additionally or alternatively, the communication interface 108 may enable one or more kinds of wireline (e.g., Universal Serial Bus (USB), Ethernet, etc.) communication.

In some configurations, multiple communication interfaces 108 may be implemented and/or utilized. For example, one communication interface 108 may be a cellular (e.g., 3G, Long Term Evolution (LTE), CDMA, etc.) communication interface 108, another communication interface 108 may be an Ethernet interface, another communication interface 108 may be a universal serial bus (USB) interface, and yet another communication interface 108 may be a wireless local area network (WLAN) interface (e.g., Institute of Electrical and Electronics Engineers (IEEE) 802.11 interface).

In some configurations, the communication interface 108 may receive cloud information from one or more remote devices. Examples of cloud information may include occupant information (e.g., occupant history, occupant preferences, etc.), template information (e.g., object detection templates, object recognition templates, expression detection and/or recognition templates, speech recognition templates, vehicle operation profiles, etc.), analysis information based on sensor data (e.g., detected objects, recognized objects, feature vectors, classified sensor data, etc.), occupant arbitration information, occupant priority information, vehicle operation determination information, etc. For instance, one or more operations may be offloaded to one or more remote devices (e.g., cloud devices, servers, etc.). In some configurations, one or more of the functions described as performed by the electronic device 102 may instead be performed by one or more remote devices, which may send cloud information indicating the processing results. In some configurations, some or all of the occupant history/preferences 144 may be received as cloud information. In other configurations, the electronic device 102 may not receive and/or utilize cloud information.

In some configurations, the electronic device 102 (e.g., image obtainer 114) may obtain one or more images (e.g., digital images, image frames, frames, video, multi-video camera feeds, lidar images, raw radar data, etc.). The one or more images (e.g., frames) may be images of a scene (e.g., a vehicle interior, vehicle truck, vehicle floor space, one or more objects, and/or background). In some configurations, the images may include one or more images of a vehicle interior and/or one or more images of a vehicle exterior. An image of a vehicle exterior may include a scene outside of a vehicle (e.g., road, road markers, one or more other vehicles, barriers, etc.) and may or may not include an image of the vehicle itself. For example, a vehicle may include one or more image sensors for capturing images of a vehicle interior (where the image sensor may be placed inside or outside of the vehicle) and/or one or more images of a vehicle exterior (where the image sensor may be placed inside or outside of the vehicle). For example, the electronic device 102 may include one or more image sensors 104 and one or more optical systems 106 (e.g., lenses). An optical system 106 may focus images of objects that are located within the field of view of the optical system 106 onto an image sensor 104. The optical system(s) 106 may be coupled to and/or controlled by the processor 112 in some configurations. A frame may be an image in a series of images (e.g., video).

A camera may include at least one image sensor and at least one optical system. Accordingly, the electronic device 102 may be one or more cameras, may include one or more cameras, and/or may be coupled to one or more cameras in some implementations. In some configurations, the image sensor(s) 104 may capture the one or more images (e.g., image frames, video, still images, burst mode images, stereoscopic images, etc.). In some implementations, the electronic device 102 may include multiple optical system(s) 106 and/or multiple image sensors 104. In some approaches, the electronic device 102 may be capable of creating a full 360 degree view (of an interior of a vehicle, for example). A camera view may selectively provide two-dimensional (2D) and/or three-dimensional (3D) views in some approaches. In some configurations, one or more image sensors 104 may be implemented (e.g., placed, mounted, etc.) inside a vehicle. Additionally or alternatively, one or more image sensors 104 may be implemented (e.g., placed, mounted, etc.) outside of a vehicle. Accordingly, image sensor(s) may be utilized to detect image data within a vehicle and/or outside of a vehicle.

Additionally or alternatively, the electronic device 102 may request and/or receive the one or more images from another device (e.g., one or more external image sensors coupled to the electronic device 102, a network server, traffic camera, drop camera, vehicle camera, web camera, security camera, remote camera, etc.). In some configurations, the electronic device 102 may request and/or receive the one or more images via the communication interface 108. For example, the electronic device 102 may or may not include a camera (e.g., an image sensor 104 and/or optical system 106) and may receive images from one or more remote devices.

The memory 126 may store instructions and/or data. The processor 112 may access (e.g., read from and/or write to) the memory 126. Examples of instructions and/or data that may be stored by the memory 126 may include sensor data 128, occupant status data 130, occupant history and/or preferences 144, vehicle information 136, image obtainer 114 instructions, sensor data obtainer 116 instructions, computer vision analyzer 118 instructions, vehicle operation manager 120 instructions, vehicle operation determiner 124 instructions, occupant arbitrator 146 instructions, and/or instructions for other elements, etc. In some configurations, the memory 126 may receive and/or store cloud information (e.g., information from one or more remote devices, from a network, from a remote server, etc.).

The occupant history and/or preferences 144 may indicate data regarding one or more occupant preferences and/or historical behaviors. For example, the occupant preferences 144 may indicate an occupant's thresholds for climate comfort (e.g., a temperature range in which the occupant is detected to be comfortable, a preferred temperature range indicated by the occupant, etc.). Additionally or alternatively, the occupant history and/or preferences 144 may indicate data about how an occupant has behaved historically (e.g., whether the occupant tends to leave items in a vehicle, temperatures at which the occupant requests a temperature change, whether an occupant defers to another occupant for one or more vehicle operations (e.g., temperature control, lighting control, driving approach, etc.), whether an occupant has been detected as uncomfortable when a large truck is in an adjacent lane, whether an occupant tends to spend time reading, working, or sleeping in a vehicle, etc.). It should be noted that in some configurations, the electronic device 102 may obtain cloud information (e.g., stored knowledge and/or auxiliary data from one or more cloud (e.g., network) devices). The cloud information may be utilized to perform one or more of the functions, methods, and/or procedures described herein in addition to or alternatively from interior sensor data.

In some configurations, the electronic device 102 (e.g., the memory 126) may include an image data buffer (not shown). The image data buffer may buffer (e.g., store) image data (e.g., image frame(s)) from the image sensor 104. The buffered image data may be provided to the processor 112.

In some configurations, the electronic device 102 may include a camera software application and/or a display 132. When the camera application is running, images of scenes and/or objects that are located within the field of view of the optical system 106 may be captured by the image sensor(s) 104. The images that are being captured by the image sensor(s) 104 may be presented on the display 132. In some configurations, these images may be displayed in rapid succession at a relatively high frame rate so that, at any given moment in time, the objects that are located within the field of view of the optical system 106 are presented on the display 132. The one or more images obtained by the electronic device 102 may be one or more video frames and/or one or more still images. In some configurations, camera data may be presented to the display 132 in a wide variety of views including single camera view, multi-camera side-by-side, and/or processed 2D/3D surround view combinations of the multiple camera inputs, etc.

The processor 112 may include and/or implement a sensor data obtainer 116, a vehicle operation manager 120, an image obtainer 114, a sensor data analyzer 138, a computer vision analyzer 118, a machine learner 140, a sensor fuser 142, an occupant arbitrator 146, and/or a vehicle operation determiner 124. It should be noted that one or more of the elements illustrated in the electronic device 102 and/or processor 112 may be optional. For example, the image obtainer 114 and/or the computer vision analyzer 118 may or may not be included and/or implemented. Additionally or alternatively, one or more of the elements illustrated in the processor 112 may be implemented separately from the processor 112 (e.g., in other circuitry, on another processor, on a separate electronic device, etc.). It should be noted that a generic item number for the sensor fuser 142 may refer to one of the sensor fuser 142a included in the sensor data obtainer 116, the sensor fuser 142b included in the vehicle operation determiner 124, or both.

The processor 112 may include and/or implement a sensor data obtainer 116. The sensor data obtainer 116 may obtain sensor data. The sensor data may indicate one or more conditions in an interior of a vehicle. For example, the sensor data may include visual information from a vehicle interior, audio information from a vehicle interior, weight information from a vehicle interior, wireless signal information from a vehicle interior, temperature information from a vehicle interior, ultrasound information from a vehicle interior, infrared (IR) information from a vehicle interior, health (e.g., wellness) information from a vehicle interior, depth information from a vehicle interior, etc. In some configurations, the sensor data may additionally or alternatively indicate one or more conditions from a vehicle exterior. For example, the sensor data may include visual information from a vehicle exterior, audio information from a vehicle exterior, wireless signal information from a vehicle exterior, temperature information from a vehicle exterior, depth information from a vehicle exterior, radar information from a vehicle exterior, lidar information from a vehicle exterior, etc. In some implementations, the sensor data obtainer 116 may obtain sensor data from one or more image sensor(s) 104 and/or other sensor(s) 122. The sensor data may be stored as all or part of the sensor data 128 in the memory 126.

Examples of sensor(s) 122 may include depth sensors, infrared (IR) sensors, ultrasound sensors, radar sensors, lidar sensors, sound sensors (e.g., microphones), health (e.g., wellness) sensors, weight sensors, motion sensors (e.g., accelerometers), location sensors (e.g., global positioning system (GPS) sensors), and/or wireless signal sensors.

Depth sensors may indicate depth data (e.g., proximity) between the depth sensor and an object. For example, a depth sensor may detect a distance (e.g., a vehicle internal distance) between the depth sensor and an occupant or object (to detect occupant presence, occupant possessions, and/or other objects). In another example, a depth sensor may detect the distance between a vehicle and another object (e.g., another vehicle, a barrier, a following distance, etc.). Lidar and/or radar may be utilized as a depth sensor in some configurations. In some configurations, one or more depth sensors may be implemented (e.g., placed, mounted, etc.) inside a vehicle. Additionally or alternatively, one or more depth sensors may be implemented (e.g., placed, mounted, etc.) outside of a vehicle. Accordingly, depth sensor(s) may be utilized to detect depth(s) within a vehicle and/or outside of a vehicle. It should be noted that a depth sensor may be implemented with one or more image sensors 104 in some configurations. For example, stereoscopic cameras may be utilized to triangulate objects inside and/or outside of a vehicle.

An ultrasound sensor (e.g., microphones) may indicate ultrasound data. For example, ultrasound data may be utilized to detect motion (e.g., occupant presence), detect objects (e.g., occupant possessions), and/or to receive information (from ultrasound devices, for example).

A sound sensor (e.g., microphones) may indicate sound data. For example, sound data may include occupant speech, occupant sounds, vehicle noise, media (e.g., audio) volume, etc.

A health sensor may indicate health data. For example, health sensors may indicate heart rate, occupant temperature, occupant motion, blood pressure, etc. Health sensors may provide an indication of occupant health status (e.g., whether one or more vital signs are within normal limits (and/or other threshold limits). For example, health sensor data may indicate whether an occupant is currently experiencing a health problem or emergency, whether an occupant is excited, whether an occupant is resting, etc.

An infrared (IR) sensor may indicate infrared data. For example, infrared data may indicate thermal data, which may be utilized to determine occupant presence, occupant position, occupant motion, cabin temperature, etc. In some configurations, one or more IR sensors may be utilized as a depth sensor (e.g., time-of-flight (ToF) camera).

A weight sensor may indicate weight data. For example, one or more weight sensors may indicate whether an occupant or an object (e.g., occupant possession) is place on a seat, on the floor, etc.

A motion sensor (e.g., accelerometer) may indicate motion data. For example, motion data may indicate user motion, vehicle motion, etc.

A location sensor (e.g., global positioning system (GPS) sensor) may indicate location data. For example, a location sensor may indicate the location of an occupant and/or vehicle.

A wireless signal sensor may indicate a wireless signal. For example, a wireless signal may be utilized to determine a location of a wireless device (through triangulation, for example). Additionally or alternatively, a wireless signal sensor may receive, decode, and/or interpret wireless signal data. For example, a wireless signal sensor may receive browsing data from a smartphone, a tablet device, and/or a computer, etc.

It should be noted that that one or more sensors 122 may be included in the electronic device 102. Additionally or alternatively, one or more sensors 122 may be separate from the electronic device 102 and may communicate with the electronic device 102. For example, weight sensors may be integrated into vehicle seats and may communicate with the electronic device 102 via the communication interface 108 to provide weight sensor data.

In some configurations, the sensor data obtainer 116 may include an image obtainer 114 and/or a sensor data analyzer 138 (which may include a computer vision analyzer 118, a machine learner 140, and/or a sensor fuser 142a, for instance). For example, obtaining the sensor data may be based on image data (of an interior of at least one vehicle and/or of an exterior of at least one vehicle) and/or based on computer vision analysis of the image data. For instance, the electronic device 102 may obtain one or more images (e.g., still images, burst images, video, etc.) of the interior of a vehicle (e.g., cabin, trunk, floor space, compartment(s), etc.). Additionally or alternatively, the electronic device 102 may obtain one or more images (e.g., still images, burst images, video, etc.) of the exterior of a vehicle (e.g., front-view camera, rear-view mirror mounted camera, hood mounted camera, side-view camera, side-view mirror mounted camera, rear-view camera, etc.).

In some configurations, the computer vision analyzer 118 may perform computer vision analysis on the image(s) to determine occupant status (e.g., occupant state data). In some implementations, some or all of the occupant status data may be stored as occupant status data 130 in memory 126. Additionally or alternatively, a remote device may obtain one or more images and/or may perform computer vision analysis to determine occupant state data, which the electronic device 102 may request and/or receive. More detail regarding obtaining image(s) and/or performing computer vision analysis is given as follows, which may be performed by the electronic device 102 and/or one or more remote devices. It should be noted that the processor 112 and/or image obtainer 114 may include and/or may be an image signal processor (ISP) for camera data. Additionally or alternatively, the processor 112 and/or image obtainer 114 may include and/or may be a radar processing chain and/or lidar processing chain.

The processor 112 (e.g., sensor data obtainer 116) may include and/or implement an image obtainer 114. One or more images (e.g., image frames, video, burst shots, etc.) may be provided to the image obtainer 114. For example, the image obtainer 114 may obtain image frames from one or more image sensors 104. For instance, the image obtainer 114 may receive image data from one or more image sensors 104 and/or from one or more external cameras. As described above, the image(s) may be captured from the image sensor(s) 104 included in the electronic device 102 or may be captured from one or more remote camera(s).

In some configurations, the image obtainer 114 may request and/or receive image data (e.g., one or more images, image frames, etc.). For example, the image obtainer 114 may request and/or receive one or more images from a remote device (e.g., external camera(s), remote server, remote electronic device, vehicle, etc.) via the communication interface 108. The images obtained from the cameras may be utilized by the electronic device 102 for computer vision analysis in some approaches.

The processor 112 may include and/or implement a sensor data analyzer 138. The sensor data analyzer 138 may analyze one or more kinds of sensor data. For example, the sensor data analyzer 138 may analyze sensor data to determine a status of one or more vehicle occupants (e.g., an occupant status). For instance, the sensor data analyzer 138 may analyze image data, sound data, health (e.g., wellness) data, weight data, wireless signal data, depth data, IR data, and/or ultrasound data to determine the status (e.g., occupant status) of one or more vehicle occupants. For example, determining an occupant status may include determining a temperature comfort level, a riding anxiety level (e.g., how comfortable or uncomfortable an occupant is based on the vehicle driving), safety level (e.g., whether an occupant's safety is threatened (by another occupant, by a person outside of the vehicle, by another vehicle, etc., for example), health level (e.g., whether an occupant's vital signs are within normal ranges), possession status (e.g., whether an occupant has left a possession in a vehicle), an activity (e.g., an activity engaged in by an occupant, such as reading, sleeping, listening to music, watching a video, working, talking on a phone, talking with another occupant, etc.), and/or a plan status (e.g., a plan of travel, one or more planned destinations, whether a change in plan is indicated, etc.). In some configurations, the occupant status may be provided to the vehicle operation determiner 124.

Sensors (e.g., sensors 122) in a vehicle may be used to create full in-vehicle situation awareness, including identifying occupants and their locations, luggage, and other objects brought into the vehicle by occupants in both the in-vehicle cabin and the trunk. Sensors may additionally or alternatively check for life threatening objects by other occupants and occupant health state. Sensors may be used to measure the situational awareness within the vehicle and recommend a proper action.

Some examples of occupant status (e.g., physical states) that may be determined by machine learning (ML) may include one or more of the following: facial expressions (e.g., fear, discomfort, annoyance, etc.), occupant state of awareness of driving events (e.g., busy browsing phone or sleeping, etc.), gait, body motion, posture, face/body temperature, and/or other signs (e.g., leaning away from traffic, shivering, signs of claustrophobia, etc.), and/or speech of occupants (e.g., tracking key words or phrases like "scary driving," "it's too dark in here," or "it's too hot in here," etc.). Some configurations may have full natural language understanding to prompt one or more users (e.g., occupants) for their preferences and/or may get direct inputs from the one or more users to make adjustments on the planned trip. Additional states that may be determined by machine learning may include objects carried by different occupants and/or medical situations of the occupants.

Some examples of states and corresponding vehicle operations or actions may include one or more of the following. Some configurations may detect that one or more occupants are complaining about temperature and adjust temperature control (e.g., heating, air conditioning, HVAC, etc.). Some configurations may detect bad driving conditions and adjust lane or speed. Some configurations may detect that an occupant needs to read and adjust in-cabin lighting. Some configurations may detect that an occupant is forgetting their luggage and alert the occupant to ensure that the occupant gets his bag before leaving. Some configurations may detect that an occupant is saying they need to change their destination based on an emergency or otherwise change plans (e.g., no longer will reach the location in time, a high-priority interrupt has caused a change in plans, etc.). Some configurations may detect that one occupant has an urgent medical situation and may reroute the plan and call an emergency service (e.g., police, ambulance, 911, etc.). Some configurations may recognize emotions (e.g., fear for a passenger, neutral emotion for a driver, etc.) to determine whether to take any action (e.g., change lane). Some configurations may detect and/or determine that a child has been left behind in a vehicle.

In some approaches, a sensor fuser 142 may fuse multiple data types (e.g., sensor data types, vehicle information, and/or cloud information). For example, the sensor fuser 142 may fuse the analysis of multiple sensor data types in order to determine occupant status. For instance, the sensor fuser 142 may utilize a weight sensor to determine where an occupant is sitting and may target sound data analysis and/or image data analysis to that region in order to determine an occupant status. In a more specific example, the sensor fuser 142 may determine that an occupant is seated near a side window of the vehicle. The sensor fuser 142 may then use image data (e.g., leaning away from the window) and/or sound data (e.g., the occupant saying "that's too bright") corresponding to that seating position as factors to determine that the occupant is uncomfortable with the lighting. The fusion of multiple sensor data types may be used to determine the occupant status and/or a vehicle operation (e.g., close a window shade, increase side window tint, etc.). In some approaches, the sensor fuser 142 may fuse sensor data corresponding to the vehicle interior with sensor data corresponding to the vehicle exterior. For example, the sensor fuser 142 may fuse image data of an occupant leaning away from a window with depth data from the vehicle exterior indicating the proximity of a large truck in an adjacent lane to determine occupant status.

In some configurations, the sensor data analyzer 138 may include a sensor fuser 142*a* for fusing the sensor data. Additionally or alternatively, the vehicle operation determiner 124 may include a sensor fuser 142*b* for fusing sensor data in determining one or more vehicle operations. For example, the sensor data fusion described herein may be performed by a sensor fuser 142*a* included in the sensor data obtainer 116, by a sensor fuser 142*b* included in the vehicle operation determiner 124, or both. For instance, determining a vehicle operation may include fusing one or more kinds of sensor data 128 (e.g., interior sensor data and/or exterior sensor data) with vehicle information 136. In some approaches, the sensor fuser 142 may fuse driving operation data, vehicle speed, etc., with vehicle proximity to an object, vehicle following distance and data (e.g., image data, tracking data, expression detection data, etc.) indicating a riding anxiety level. For instance, the vehicle operation determiner 124 may determine a vehicle operation to reduce speed, change lanes, extend following distance, etc., in response to an occupant status of elevated riding anxiety and/or leaning away from a window.

In some configurations, the processor 112 may include and/or implement a machine learner 140. The machine learner 140 may perform machine learning based on the sensor data in order to determine and/or refine the occupant status determination.

The processor 112 may include and/or implement a computer vision analyzer 118. The computer vision analyzer 118 may perform computer vision analysis on the image data (e.g., one or more images). In particular, the computer vision analyzer 118 may perform object detection, object recognition, object tracking, object classification, face detection, face recognition, optical character recognition, scene understanding, emotion detection, comfort level detection, anxiety level detection, and/or optical character recognition, etc. The computer vision analysis may be utilized to determine the occupant status (e.g., state data). For example, the computer vision analysis may be utilized to determine the comfort level of one or more occupants (e.g., driver and/or passenger(s)) of a vehicle.

In some configurations, one or more cameras may have a view of a vehicle interior (e.g., seats, floor space, trunk, compartment(s), etc.). The camera(s) may capture image data (e.g., one or more images of the vehicle interior). The image data may be provided to the image obtainer 114. For example, the electronic device 102 may include a camera (e.g., image sensor 104 and optical system 106) that may capture the image data and provide the image data to the image obtainer 114. In another example, a remote camera in a vehicle may capture image data and/or may send the image data to the electronic device 102 (e.g., image obtainer 114). The image obtainer 114 may provide the image data to the computer vision analyzer 118. In some cases, the image data from one or more cameras may be sent (e.g., streamed) to a remote device. This may enable remote monitoring of the vehicle interior, which may enable remote monitoring for one or more situations (e.g., emergency situations, safety situations, etc.).

In some configurations, the computer vision analyzer 118 may perform object detection to produce all or part of the occupant state data. For example, the computer vision analyzer 118 may detect facial expressions (e.g., fear, discomfort, annoyance, etc.), occupant state of awareness of driving events (e.g., busy browsing phone or sleeping, etc.), gait, body motion, posture, and/or other indications (e.g., leaning away from traffic, shivering, signs of claustrophobia, etc.) of occupant status. Additionally or alternatively, the computer vision analyzer 118 may detect one or more occupant possessions by detecting one or more objects in the image data (e.g., in one or more images, in one or more subsets of the image(s), etc.). Object detection may be based on motion and/or a detection model. For example, motion may be used to separate moving objects from a background. Additionally or alternatively, the image data (e.g., one or more images and/or one or more subsets of one or more images) may be searched for one or more objects using a detection model. For instance, one or more subsets (e.g., windows, sliding window positions, etc.) of the image data may be compared with the detection model to determine whether an object represented by the detection model is in the image data. For example, the computer vision analyzer 118 may correlate the image data with the detection model, may determine a similarity between the image data and the detection model, and/or may determine a probability of a match between the image data and the detection model, etc. Object detection may be utilized to classify one or more occupant statuses (e.g., states).

In some approaches, the computer vision analyzer 118 may recognize one or more objects (e.g., objects, characters, faces, etc.) to produce all or part of the occupant state data. For example, the computer vision analyzer 118 may determine recognition data (e.g., one or more keypoints, corners, edges, and/or feature vectors, etc.) from the image data. For instance, the recognition data may represent one or more aspects of one or more objects. In some approaches, the computer vision analyzer 118 may search the image data for keypoints, corners, edges, etc.

The computer vision analyzer 118 may have access to one or more recognition models corresponding to one or more objects. For example, the memory 126 may store the one or more recognition models. Examples of the recognition model(s) may include images, keypoint sets, point clouds, point models (e.g., deformable models, non-deformable models), mesh models, feature vectors, etc. Additionally or alternatively, the computer vision analyzer 118 may produce one or more recognition models. For example, the computer vision analyzer 118 may detect one or more objects accompanying an occupant. The computer vision analyzer 118 may develop a recognition model to recognize the object(s) (e.g., possessions) of the occupant. The recognition model may be utilized to recognize an object that is left behind by an occupant (to notify the occupant of a mislaid possession, to charge a rider an additional fee for waste left in the vehicle, etc., for example).

The computer vision analyzer 118 may compare the recognition data (e.g., keypoints, corners, edges, and/or feature vectors, etc.) with the recognition model(s) to determine whether the recognition data matches one or more recognition models. For example, the computer vision analyzer 118 may correlate the recognition data with the recognition model(s), may determine one or more distance measures between the recognition data and the recognition model(s), may determine a transformation between the recognition data and the recognition model(s), may determine a matching probability between the recognition data with the recognition model(s), etc. Comparing the recognition data with the recognition model(s) may produce one or more matching metrics, which may indicate a degree of similarity (and/or difference) between the recognition data and the recognition model(s). A match may be indicated by the matching metric(s). For example, a matching metric that meets a threshold (e.g., similarity threshold, probability threshold, distance threshold, recognition threshold, etc.) may indicate that the object in the image is the kind of object corresponding to the recognition model(s). Additionally or alternatively, a matching metric that meets a threshold may indicate an occupant emotion (e.g., an anxious appearance, a fearful appearance, a relaxed appearance, an uncomfortable appearance, etc.). Object recognition may be utilized to classify one or more objects, to determine what possessions an occupant has, to determine whether an object poses a safety risk, whether a possession has been left in the vehicle, etc.

It should be noted that object recognition may provide different and/or additional information than object detection in some configurations. For example, object detection may detect that an object (e.g., occupant) is indicated in image data, while object recognition may recognize the object (e.g., occupant identity, occupant state, etc.). In some approaches, object detection may indicate the presence of an object, while object recognition may be used to classify an object (e.g., identify an object type, identify an occupant expression, etc.). In other approaches, object detection may be used to classify an object (e.g., identify an object type), while object recognition may be used to recognize one or more characteristics of the object. For example, object detection may detect an occupant, while object recognition may determine a status of the occupant. It should be noted that one or more machine learning techniques may be implemented and/or employed in some configurations of the systems and methods disclosed herein. For example, machine learning computer vision may be employed. Additionally or alternatively, threshold-based computer vision may be implemented and/or employed in some configurations of the systems and methods disclosed herein.

Additionally or alternatively, the computer vision analyzer 118 may perform object tracking. For example, the computer vision analyzer 118 may track an object over two or more frames. In some approaches, object tracking may be performed by searching a subsequent frame for an object detected, recognized, and/or tracked in a previous frame. For instance, the computer vision analyzer 118 may track keypoints, corners, edges, and/or feature vectors of an object between frames. Optical flow is one example of object tracking that may be performed. Object tracking may be utilized to determine whether a possession has been left or been taken from the vehicle, etc. In some configurations, object tracking may be utilized to determine object (e.g., occupant) motion. For example, object tracking may indicate whether an occupant is leaning away from a window, whether an occupant has changed seats, whether an occupant has reclined, etc.

In some configurations, the computer vision analyzer 118 may perform analysis to produce computer analysis data (e.g., bounding boxes around individual items, segmentation of individual items, and/or one or more derived descriptions of an item's identity and/or location, etc.). For example, an object's center may be derived from a bounding box or segmentation representation.

Additional or alternative approaches may be implemented to determine occupant status (e.g., state data) in some configurations. For example, other sensor(s) 122 may be implemented in addition to or alternatively from cameras with computer vision. For instance, weight sensors may be located under and/or near each occupant. The sensors may measure presence or absence of an occupant. One or more microphones may capture audio. The processor 112 may perform speech recognition and/or natural language processing based on speech from within the vehicle to determine occupant state data. Wireless signal sensor(s) (e.g., one or more communication interfaces 108) may monitor wireless signals to determine the presence, location, and/or state of one or more occupants. One or more wellness sensors may indicate the presence and/or state of one or more occupants (e.g., excited, anxious, calm, angry, whether there is a health issue, etc.). More examples are given in relation to FIG. 3. For example, the sensor data analyzer 138 may be invoked to determine a new state (e.g., occupant status). The sensor data analyzer 138 may decide to use one or more sensor data in addition to or alternatively from computer vision in order to determine the state (e.g., occupant status) as described in relation to FIG. 5. The sensor data analyzer 138 may then fuse the information from the multiple modalities together in order to determine the state (e.g., accurate state, optimal state, occupant status, etc.).

The processor 112 may include and/or implement a vehicle operation determiner 124 in some configurations. The vehicle operation determiner 124 may determine (e.g., identify) one or more vehicle operations based on the sensor data. For example, the vehicle operation determiner 124 may determine a vehicle operation in response to one or more occupant statuses. For instance, if the sensor data indicates that an occupant is uncomfortable due to cabin temperature, the vehicle operation determiner 124 may determine a heating or cooling adjustment to improve occupant comfort. In some configurations, the vehicle operation determiner 124 may obtain at least one occupant status for at least one occupant based on the sensor data. For example, the vehicle operation determiner 124 may receive one or more occupant statuses from the sensor data obtainer 116 (e.g., sensor data analyzer 138, computer vision analyzer 118, machine learner 140, and/or sensor fuser 142a). Additionally or alternatively, the vehicle operation determiner 124 may determine one or more vehicle occupant statuses. For instance, the vehicle operation determiner 124 (e.g., sensor fuser 142b) may fuse sensor data to determine one or more vehicle occupant statuses.

Examples of vehicle operations may include adjusting temperature control, adjusting driving control (e.g., following distance, proximity to another vehicle, proximity to the edge of a road, proximity to a barrier, speed, acceleration rate, braking rate, etc.), alerting a user of a mislaid possession (e.g., abandoned possession), rearranging a layout of the vehicle interior (e.g., changing seat position(s)), adjusting cabin lighting, adjusting a destination plan, adjusting windows, adjusting door locks, opening or closing a door, opening or closing one or more windows, opening or closing a trunk, contacting a service agent, alerting a vehicle occupant of traffic conditions, driving the vehicle to a destination, driving the vehicle to a service center, driving the vehicle to a medical facility (e.g., hospital, clinic, etc.), driving the vehicle to an emergency service provider (e.g., police station, fire station, etc.), sending information (e.g., an email, a text message, streaming image data, streaming video, making a phone call, etc.) to a remote device, etc.

In some approaches, performing the vehicle operation may include sending image data (e.g., streaming video) to one or more remote devices. For example, in a case where the electronic device 102 detects an emergency (e.g., detects extreme fear or distress from an occupant, detects a child left in the vehicle, detects a person stealing something, detects an occupant with a medical emergency, detects potential harm to the occupant, etc.), the vehicle operation determiner 124 may send information to one or more remote devices. For instance, in a case where a child is left in the vehicle, the electronic device 102 (e.g., vehicle operation determiner 124) may send a notification and/or stream video of the vehicle interior to a parent. This may enable the parent to monitor the situation. Additionally or alternatively, the electronic device 102 (e.g., vehicle operation determiner 124) may activate the air conditioning, lower the windows, notify emergency services (e.g., 911), and/or stream video to emergency services. Additionally or alternatively, the electronic device 102 may send information (e.g., stream video) to one or more network (e.g., cloud) devices for monitoring.

In some configurations, the vehicle operation determiner 124 may arbitrate between multiple vehicle occupants. For example, the vehicle operation determiner 124 may include an occupant arbitrator 146. The occupant arbitrator 146 may arbitrate between multiple occupants to determine whether to perform one or more vehicle operations. For example, the vehicle operation determiner 124 may determine whether to perform a vehicle operation based on multiple portions of sensor data. For instance, a first portion of sensor data may correspond to a first occupant and a second portion of sensor data may correspond to a second occupant. The portions of sensor data may be utilized to determine occupant status(es) and/or occupant priority(ies). Arbitration may be based on the portions of sensor data (e.g., the occupant status(es) and/or occupant priority(ies)). In some configurations, the occupant arbitrator 146 may determine a vehicle occupant priority (and/or vehicle operation priority) for each of the multiple occupants.

The vehicle operation determiner 124 may determine whether to perform a vehicle operation (and/or determine which vehicle operation to perform, for example) based on the priority. For example, arbitrating between the multiple occupants may include determining to perform a vehicle operation in a case that the vehicle operation corresponds to an occupant with a priority that is higher than each priority of the one or more other occupants.

Additionally or alternatively, arbitrating between the multiple occupants may include determining to perform a vehicle operation in a case that performing the vehicle operation corresponding to an occupant with a priority would not violate any preference corresponding to any other occupant with a higher priority. For example, the occupant arbitrator 146 may determine to increase the temperature in the vehicle for an occupant if increasing the temperature would not exceed a preference threshold (e.g., a temperature comfort threshold) of another occupant with a higher priority. In some approaches, the temperature may be increased up to the temperature comfort threshold of another occupant without exceeding the temperature comfort threshold.

Additionally or alternatively, arbitrating between the multiple occupants may include determining to not perform a vehicle operation in a case that performing the vehicle operation corresponding to an occupant with a priority would violate any preference corresponding to any other occupant with a higher priority. For example, the occupant arbitrator 146 may determine to not increase the temperature in the vehicle for an occupant if increasing the temperature would exceed a temperature comfort threshold of another occupant with a higher priority. More examples are given in relation to one or more of FIGS. 4-5 and 7-11.

In some approaches, each occupant may have a priority that is the same for all types of vehicle operations. For example, each occupant may have a uniform priority for every potential vehicle operation (e.g., climate control, lighting, driving pattern, music selection, music volume, etc.). In other approaches, different occupants may have differing priorities based on vehicle operation type. For instance, a first occupant may have a higher priority than a second occupant for climate control, while the second occupant may have a higher priority than the first occupant for lighting. Accordingly, the occupant arbitrator 146 may determine occupant priority based on potential vehicle operation type in some approaches.

In some configurations, the electronic device 102 (e.g., processor 112, sensor data analyzer 138, vehicle operation determiner 124, occupant arbitrator 146, etc.) may determine and/or utilize occupant priority in accordance with more or more of the following aspects.

In some approaches, the electronic device 102 (e.g., occupant arbitrator 146) may, by default, start with a uniform priority for each occupant. Occupant priority may be adjusted based on priority criteria and/or decision criteria (including historical learning in a case of a repeat group of occupants, for example).

The electronic device 102 (e.g., machine learner 140, sensor fuser 142*a-b*, and/or occupant arbitrator 146, etc.) may study and/or learn group dynamics. For a repeat group of occupants (e.g., customers, guests, etc.), the electronic device may maintain a prioritization history and/or feedback (e.g., which occupant is the dominant occupant for a final decision).

Some examples of inputs to prioritization criteria for each occupant may include one or more of the following. One example may include occupant status (e.g., state) for each occupant. For instance, occupant status (e.g., state) may indicate whether each occupant is comfortable, neutral, mildly uncomfortable, or strongly uncomfortable, etc. It should be noted that other, fewer, more, and/or different kinds of occupant states may be utilized. In some configurations, occupant priority may be based on a difference between occupant status and a desired occupant status. For example, the difference between the occupant status and the desired occupant status (for that occupant, for instance) may be utilized to determine whether to prioritize an occupant. For instance, assume that an occupant is second in priority. If the occupant's status is mildly uncomfortable and the desired occupant status is neutral (a difference of one step, for example), the occupant priority may not be increased. If the occupant's status is strongly uncomfortable and the desired occupant status is neutral (a difference of two steps, for example), the occupant priority may be increased. It should be noted that the desired occupant status may be assumed by default (e.g., neutral or comfortable), received via user input (e.g., the user sets the desired occupant status), and/or determined based on sensor data (e.g., a status when the occupant shows a pleased expression, shows a neutral expression, and/or does not make requests for change). It should be noted that different status difference thresholds (e.g., one step, two steps, three steps, etc.) for determining whether to prioritize an occupant may be implemented and/or utilized.

In some configurations, the occupant priority may be determined based on one or more preference thresholds (e.g., minimum and/or maximum preference thresholds). For example, an occupant may be prioritized in a case that one or more conditions cross one or more preference thresholds. For instance, if the cabin temperature exceeds a maximum temperature threshold for an occupant, that occupant's priority may be increased. One or more preference thresholds (e.g., lighting threshold(s), sound volume threshold(s), driving proximity threshold(s), temperature threshold(s), etc.) may be utilized to determine priority. In some configurations, occupant status may be based on the one or more preference thresholds. For example, whether a condition is beyond a preference threshold and/or to what degree the condition is beyond a preference threshold may be utilized to determine occupant status. In some cases, an occupant priority may be increased based on level of discomfort (e.g., preference threshold(s), comfort threshold(s), and/or discomfort threshold(s)).

Another example may include personality factors (e.g., whether an occupant is compliant, deferential, dominant, needy, a complainer, etc.). For instance, the electronic device 102 (e.g., processor 112) may include and/or implement algorithms and processing on sensor data and history to classify occupants to understand who is most likely to be dissatisfied or complain.

Another example of an input to prioritization criteria may include a hierarchy. In some approaches, the hierarchy may be based on whether an occupant is the vehicle owner. For instance, prioritization control (e.g., ownership) may be given to the vehicle owner. For example, the vehicle owner may prioritize themselves, may want consensus priority, or may prioritize guests, etc. In some approaches, the hierarchy may be a predefined hierarchy. For instance, the electronic device 102 may receive an input from a user (e.g., owner, technician, etc.) that indicates the priority of one or more users (e.g., occupants, potential occupants, etc.). In some approaches, the electronic device 102 may provide (e.g., present, display, etc.) a set of previously identified occupants. The user input may indicate the priority for one or more of the previously identified occupants.

In some approaches, the hierarchy may be based on a ride-share occupant (e.g., passenger) that has booked the ride or is paying. For example, a booking ride-share occupant may have prioritization control (similar to a vehicle owner, for instance).

In some approaches, the hierarchy may be based on family (e.g., family structure). A prioritization scheme may be determined by the parent(s) and/or or based on historical data. For example, one or more spouses (e.g., wife, husband, partner, etc.) may determine (and input, for instance) if there is a deferral and/or priority order.

In some approaches, the hierarchy may be based on corporate dynamics and/or a work team. For example, the electronic device 102 may detect occupant and/or company hierarchy. For instance, the hierarchy may prioritize the boss or a highest ranking occupant. The electronic device 102 may establish work hierarchy from sensor(s) 122 and/or other data in some configurations. For example, the electronic device 102 may access title information from a social networking website and/or from a car share service profile, etc. Additionally or alternatively, the electronic device 102 (e.g., sensor data analyzer 138) may perform optical character recognition from images to determine titles on badges worn by the occupant(s) and/or speech recognition to determine one or more titles being used in conversation.

In some approaches, the hierarchy may be based on a customer/host relationship. For example, a customer/client may be prioritized over a host/vendor.

In some approaches, the hierarchy may be based on occupant frequency (e.g., how often the occupant uses or rides in the vehicle). For example, occupants may be prioritized based on which occupant uses the vehicle more frequently.

One or more forms of decision criteria may be implemented and/or utilized. For example, the decision criteria may be different depending on whether the vehicle is an owned vehicle versus a ride share vehicle. In some approaches, the electronic device 102 (e.g., processor 112, sensor data obtainer 116, vehicle operation determiner 124, occupant arbitrator 146, etc.) may utilize one or more of the following decision criteria. One decision criterion may be a consensus maximum average comfort level. For example, the electronic device 102 may seek a highest average satisfaction and/or comfort level. Another decision criterion may include a majority criterion. For example, the electronic device 102 may favor a majority versus targeting best average comfort.

Another decision criterion may include the hierarchy. For example, the electronic device 102 may satisfy occupants (e.g., customers) weighted by hierarchy and/or priority criteria.

Another decision criterion may include minimizing negative experience. For example, the electronic device 102 may seek to maintain a lowest level of discomfort across all occupants (e.g., passengers).

Another decision criterion may include minimizing a probability of complaint and/or poor rating (in case of ride share, for instance.) For example, the electronic device 102 may assess personality types, may access (if available) passenger rating history, and/or may determine which occupant booked and/or is most likely to give rating feedback for the ride. One or more of these factors may be taken into account in the decision criteria. For example, the comfort of one or more occupants that are more likely to give feedback may be prioritized.

In some configurations, the electronic device 102 may obtain and/or store vehicle information 136. The vehicle information 136 may indicate one or more operational aspects of a vehicle. Examples of vehicle information 136 may include cabin temperature, heating, ventilation, and air conditioning (HVAC) operation status, door lock status, window status, sunroof status, entertainment system (e.g., music system, video system, etc.) status, driving status (e.g., speed, braking, etc.), seat heater status, lighting status, etc. In some configurations, the sensor fuser 142 may fuse vehicle information 136 with sensor data 128 to determine an occupant status and/or to determine a vehicle operation.

The processor 112 may include and/or implement a vehicle operation manager 120. The vehicle operation manager 120 may perform one or more vehicle operations. For example, the vehicle operation manager 120 may perform one or more of the vehicle operations determined by the vehicle operation determiner 124 (in a case that the vehicle operation determiner 124 determines to perform the vehicle operation(s), for instance). In some configurations, the vehicle operation determiner 124 may adjust cabin temperature, adjust cabin lighting, adjust console lighting, unlock one or more doors, lock one or more doors, open one or more doors, close one or more doors, open one or more windows, close one or more windows, command a lane change, command a reduced speed, command an increased speed, activate or deactivate audio (e.g., music), adjust audio volume, activate or deactivate video (e.g., a movie, a show, etc.), change video volume, adjust display brightness (of the display 132 and/or one or more other displays, for example), command a route change, send a reminder message (e.g., text message, email, etc.) to a vehicle occupant (or previous vehicle occupant) to remember a possession in the vehicle, prompt an occupant for input, send information (e.g., stream one or more camera outputs) to a remote device, etc.

Some examples of sensor data, device perception (which may imply an occupant state, for instance), and vehicle operations are given in Table (1) as follows. One or more of these use cases may be implemented in accordance with some configurations of the systems and methods disclosed herein.

TABLE 1

| Sensor Data | Perception (Implied by Sensor Data) | Perception (Natural Language Input) | Vehicle Operation |
|---|---|---|---|
| Camera footage of occupant | Recognize occupant is shivering, rubbing hands, or other actions that indicate occupant is cold | Occupant says they are cold | Adjust temperature up and/or prompt the occupant if they would like the car warmer |
| Camera footage in trunk | Awareness that occupant loaded a bag in the trunk; understanding when ride is done whether occupant collected their bag or not | | If occupant has a bag in the trunk, remind the occupant to get their bag and/or automatically open the trunk; verify that their bag is removed from car before finalizing the trip (e.g., before completing the billing transaction) |
| Mic input, camera inputs | Customer is not happy about something; disagreement on plan of action or unknown conflict resolution | Customer asks to speak to a live person | Connect to a service center through a cellular (e.g., LTE) modem including providing video and audio feed from car to a service agent |
| Camera feed | Occupant left trash in the car | | Take car into a service center to be cleaned or alternate self-cleaning function |
| Cloud connectivity to route traffic information | Awareness of major traffic delay | | Update occupant on traffic conditions; ask whether to pursue alternate (e.g., longer back-road route) |

Some configurations of the systems and methods disclosed herein may take one or more of the following considerations (e.g., other virtual chauffer considerations) into account in determining one or more vehicle operations. For example, traffic conditions may prevent reaching the original destination by a required time. In some approaches, the electronic device 102 (e.g., vehicle operation manager 120) may prompt an occupant on what the occupant wants to do. Plans may be adjusted based on occupant input. In another example, the vehicle may arrive at a target destination but may determine that the target destination is not the right place. The electronic device 102 (e.g., vehicle operation manager 120) may prompt an occupant for additional information (e.g., input on what to do). In some approaches, the electronic device 102 (e.g., vehicle operation manager 120) may get further support from one or more remote devices (e.g., cloud, network devices, etc.) if the occupant does not have any ideas.

It should be noted that in some approaches, once an occupant enters the vehicle, one objective may be to have seamless interaction directly with the in-vehicle virtual chauffer using natural voice communication. In some cases, this may be beneficial instead of the occupant having to continue to interact using manual text and/or touch user interface through an application on their phone (e.g., cell phone, smart phone, etc.) or by calling with their personal phone into a service center.

It should be noted that some configurations of the systems and methods disclosed herein may be implemented for non-self-driving car applications for full in-vehicle situational awareness. For example, some configurations may be implemented in a vehicle service with a driver. It may still be relevant to detect that a possession (e.g., luggage, a wallet, or a cellphone, etc.) has been left behind. In this case, the electronic device 102 (e.g., vehicle operation manager 120) may alert a vehicle service driver and/or the corresponding occupant. Some configurations may be implemented in a personal car. For instance, the electronic device 102 may maintain full contextual awareness of typical behaviors. For example, does a driver typically leave his coat in the car or take it with him. This may help to understand whether the driver forgot the coat or whether it is just an expected pattern. In some approaches, the electronic device 102 (e.g., vehicle operation manager 120) may email an occupant (e.g., driver or passenger) indicating that they have left their wallet or keys in the seat.

In another example, the electronic device 102 may monitor the state of a child left in the car while the parents are in a supermarket. In this case, the electronic device 102 (e.g., vehicle operation manager 120) may adjust vehicle temperature (as a first step, for example). The electronic device 102 (e.g., vehicle operation manager 120) may contact (e.g., email, text, call, page, etc.) the driver and/or parent(s) (as a second step, for example). The electronic device 102 (e.g., vehicle operation manager 120) may alert emergency services (e.g., 911) (as a third step, for example). Additionally or alternatively, in the case a child is left in a vehicle, additional information may be sent when notifying one or more remote parties. For example, in addition to sending a notification (e.g., sending a text and/or notifying emergency services), the electronic device 102 may indicate the temperature in the vehicle, the length of time child has been left alone, streaming camera data to show the vehicle interior, and/or other useful information. In some approaches, the electronic device 102 may allow remote control to one or more remote parties. For example, the electronic device 102 may allow an option to remotely lower windows, to start air conditioning (AC), etc. (if appropriate security measures are included, for instance). In some configurations, the electronic device 102 may receive an instruction, text message, email, phone call, etc., to allow remote control of one or more vehicle operations.

It should be noted that feature extraction may be performed for a variety of sensors. For example, the feature extractor 576 may utilize computer vision to extract features (of a first type, for instance) from a camera and may extract features (of a second feature type, for instance) from a microphone. Fusion may be performed based on the features. Arbitration across occupant priorities may also be performed.

In some configurations of the systems and methods disclosed herein, one or more operations may be offloaded to a remote device (e.g., network, cloud device, etc.). For example, the electronic device 102 may obtain sensor data and send the sensor data to a remote device. The remote device may perform analysis (e.g., computer vision analysis, machine learning, sensor fusion, etc.) on the sensor data, may determine one or more vehicle operations, and/or may arbitrate between occupants as described in relation to the electronic device 102. The remote device may send the analysis results (e.g., cloud information, detection results, recognition results, sensor fusion results, potential vehicle operation(s), etc.) to the electronic device 102. The electronic device 102 may receive the analysis results (e.g., cloud information) and may perform one or more operations based on the analysis results. For example, the electronic device 102 may receive detection and/or recognition results and may determine an occupant status based on the results. In another example, the electronic device 102 may receive one or more vehicle operations and may arbitrate between occupants based on the vehicle operation(s). Accordingly, a portion of one or more of the operations described herein may be offloaded to one or more cloud devices.

In some configurations of the systems and methods disclosed herein, the electronic device 102 may receive information (e.g., sensor data) from a remote device and may perform analysis for the remote device. For example, a remote vehicle may send sensor data to the electronic device 102. The electronic device may perform analysis (e.g., computer vision analysis, machine learning, sensor fusion, etc.) on the sensor data, may determine one or more vehicle operations, and/or may arbitrate between occupants. The electronic device 102 may send the results to the remote device.

It should be noted that one or more of the elements or components of the electronic device 102 may be combined and/or divided. For example, one or more of the sensor data obtainer 116, the image obtainer 114, the sensor data analyzer 138, the computer vision analyzer 118, the machine learner 140, the sensor fuser 142, the vehicle operation determiner 124, the occupant arbitrator 146, and/or the vehicle operation manager 120 may be combined. Additionally or alternatively, one or more of the sensor data obtainer 116, the image obtainer 114, the sensor data analyzer 138, the computer vision analyzer 118, the machine learner 140, the sensor fuser 142, the vehicle operation determiner 124, the occupant arbitrator 146, and/or the vehicle operation manager 120 may be divided into elements or components that perform a subset of the operations thereof.

Figure 2:
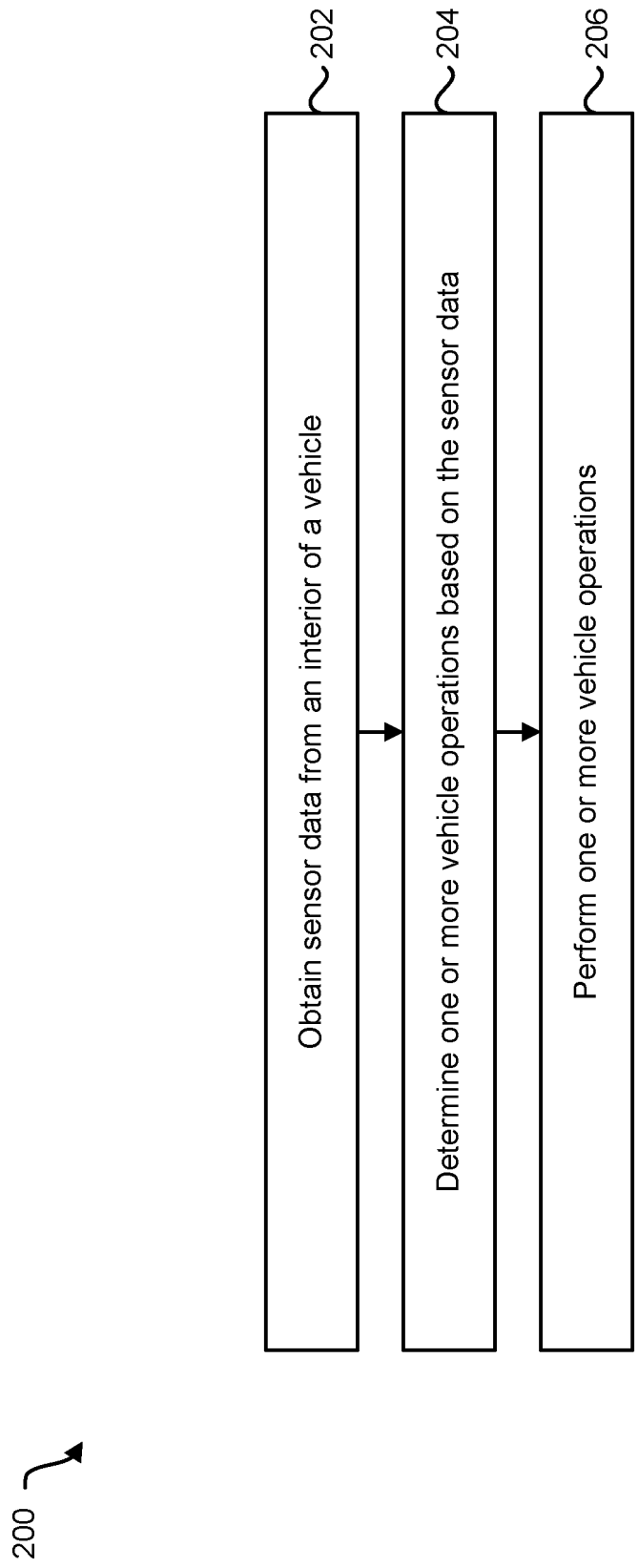
FIG. 2 is a flow diagram illustrating one configuration of a method for operating a vehicle based on sensor data and/or cloud information.

FIG. 2 is a flow diagram illustrating one configuration of a method 200 for operating a vehicle based on sensor data and/or cloud information. The method 200 may be performed by the electronic device 102 in relation to FIG. 1, for example.

The electronic device 102 may obtain 202 sensor data from an interior of a vehicle. This may be accomplished as described in relation to one or more of FIGS. 1 and 3. For example, the electronic device 102 may obtain sensor data from one or more integrated sensors and/or remote sensors that capture data from an interior of a vehicle. In some configurations, the electronic device 102 may additionally or alternatively obtain sensor data from a vehicle exterior. For example, the electronic device 102 may obtain sensor data (e.g., visual information, audio information, depth information, proximity information, radar, lidar, etc.) that indicates information outside of a vehicle. In some configurations, the electronic device 102 may additionally or alternatively obtain vehicle information. For example, the electronic device 102 may request and/or receive vehicle information pertaining to one or more vehicle operations (e.g., vehicle driving, vehicle speed, cabin temperature control information, cabin lighting information, media system information, door status information, door control information, window status information, window control information, sunroof status information, sunroof control information, tailgate status information, tailgate control information, etc.). In some configurations, the electronic device 102 may additionally or alternatively obtain cloud (e.g., network) information (e.g., stored knowledge and/or auxiliary data from one or more cloud devices).

The electronic device 102 may determine 204 (e.g., identify) one or more vehicle operations based on the sensor data. This may be accomplished as described in relation to one or more of FIGS. 1, 4-7 and 11. For example, the electronic device 102 may perform computer vision analysis on one or more images to determine occupant status for one or more occupants. The electronic device 102 may determine 204 one or more vehicle operations in response to the one or more occupant statuses. Additionally or alternatively, the electronic device 102 may determine 204 the one or more vehicle operations based on sensor data from a vehicle exterior, vehicle information, and/or cloud information (in addition to or alternatively from interior sensor data).

The electronic device 102 may perform 206 one or more vehicle operations. This may be accomplished as described in relation to one or more of FIGS. 1, 4, 7 and 11. For example, the electronic device 102 may perform one or more vehicle operations in a case that it is determined to perform any of the one or more vehicle operations. For instance, the electronic device 102 may determine whether to perform any of the one or more vehicle operations. In a case of only a single occupant, the electronic device 102 may perform 206 the one or more vehicle operations. In some approaches, the electronic device 102 may arbitrate between multiple occupants. For example, the electronic device 102 may perform any of the vehicle operations that do not violate a preference of any higher priority occupant.

Figure 3:
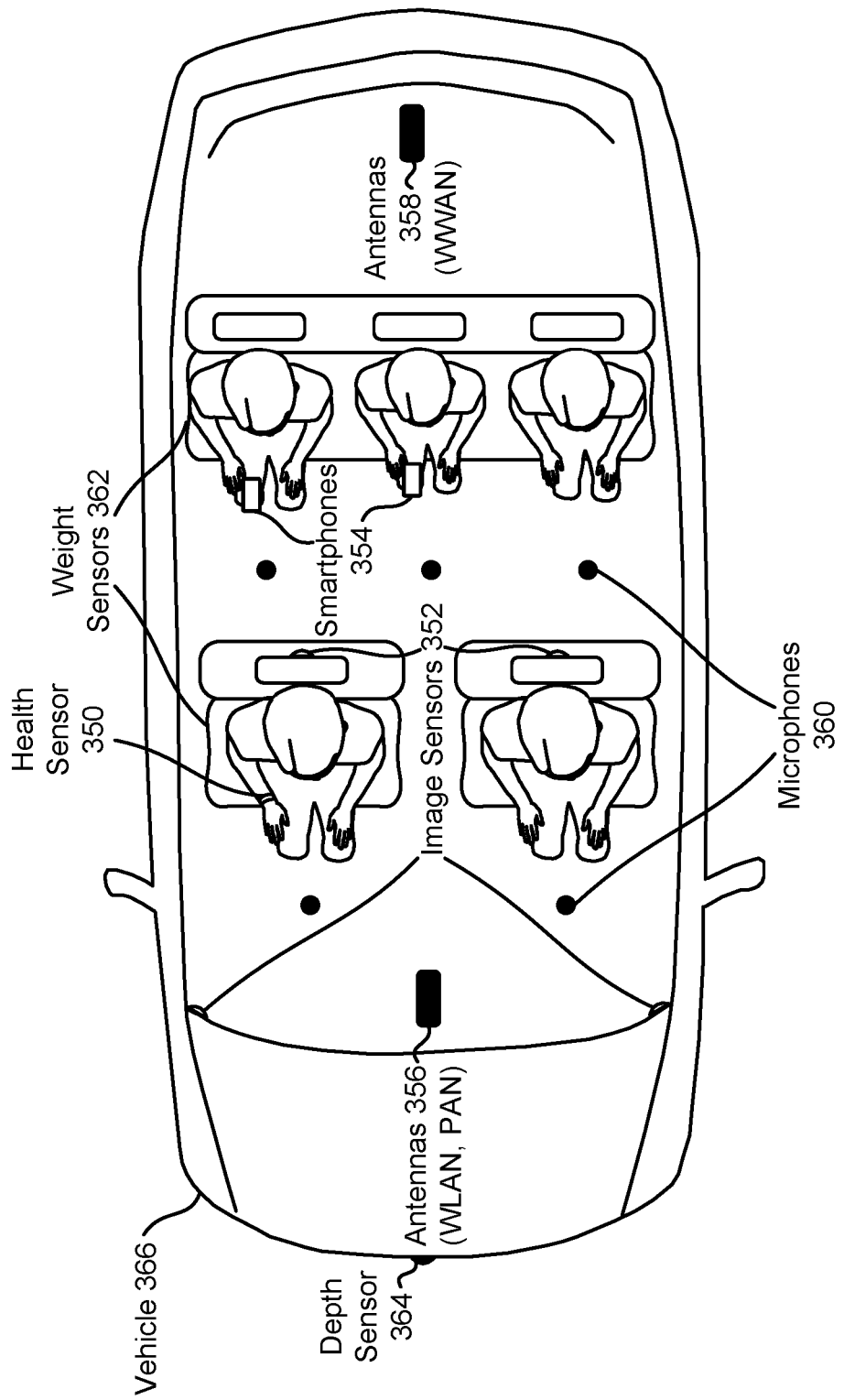
FIG. 3 is a diagram illustrating an example of a vehicle and various sensors that may be implemented in some configurations of the systems and methods disclosed herein.

FIG. 3 is a diagram illustrating an example of a vehicle 366 and various sensors that may be implemented in some configurations of the systems and methods disclosed herein. Examples of sensors that may be utilized may include wireless communication antennas 356, 358 (e.g., wireless local area network (WLAN) antennas, Wi-Fi antennas, personal area network (PAN) antennas, Bluetooth antennas, wireless wide area network (WWAN) antennas, WWAN cellular antennas, etc.), health sensors 350 (e.g., attached wellness sensors, fitness trackers, etc.), weight sensors 362 (e.g., weight sensors integrated into each seat of the vehicle 366), mobile devices (e.g., smartphones 354), image sensors 352 (e.g., red green blue (RGB) sensors), infrared (IR) sensors, depth sensors 364, ultrasound sensors, sound sensors (e.g., microphones 360), etc. Although a particular arrangement of some types of sensors is illustrated in FIG. 3, it should be noted that different arrangements may be implemented in accordance with the systems and methods disclosed herein. For example, a depth sensor may be utilized within the vehicle 366 (for detecting occupancy, detecting objects (e.g., abandoned possessions), etc., for example). Additionally or alternatively, one or more image sensors may be implemented (e.g., placed, mounted, etc.) on the outside of the vehicle 366. In some configurations, the depth sensor 364 may be implemented with one or more image sensors. Additionally or alternatively, different numbers of one or more types of sensors may be utilized. For example, one or more additional image sensors may be arranged in a cargo area (e.g., trunk).

Some configurations of the systems and methods disclosed herein may provide advanced in-vehicle situation awareness (e.g., a full in-vehicle and passenger awareness). FIG. 3 illustrates examples of some hardware and software components that may be utilized in some implementations.

In some configurations, wireless communication signals (e.g., Wi-Fi and/or Bluetooth, etc.) may be utilized to identify and/or localize occupants. For example, one or more occupants may be identified by registration to a network. Additionally or alternatively, one or more occupants may be localized by triangulation of multiple antennas.

Health sensors (e.g., attached wellness sensors) may sense one or more types of information (e.g., heart rate, temperature, motion, etc.) that may indicate one or more aspects of occupant status. In some configurations, machine learning (ML) (in the health sensor 350 and/or in the vehicle 366, for example) may be utilized to learn about occupant status based on the sensor data from a health sensor 350. Weight sensors 362 may be used to detect and/or identify occupant(s) and to know if someone is leaving or has left an object (e.g., has forgotten anything once he/she leaves).

Content of browsing on a smartphone 354 may be used to assess an occupant status. For example, the vehicle 366 may receive and/or observe the operational content on a smartphone 354 that may indicate one or more aspects of occupant status (e.g., plans, emotions, health, safety, etc.).

In some configurations, machine learning may be used to identify one or more occupants and/or occupant states by fusing variable modalities. For example, one or more image (e.g., RGB) sensors, IR sensors, depth sensors, ultrasound sensors, microphones, and/or health sensors may be used for occupant state assessment. One or more of these sensors can additionally or alternatively be used to know if an occupant has forgotten something in the vehicle.

A cellular modem (e.g., 3G, Long-Term Evolution (LTE), 5G, etc.) may be used to connect to the cloud for additional support on decision making and/or back-up connection to an extended service operator.

In some configurations, one or other sensors (e.g., depth sensors, image sensors, radar, lidar, etc.) may be utilized. For example, one or more other sensors may be utilized to obtain interior and/or exterior information. For instance, sensors (e.g., depth sensor(s), image sensor(s), radar, and/or lidar) may be utilized to determine whether a vehicle (e.g., a large vehicle) is driving in a lane adjacent to the vehicle. Additionally or alternatively, image data, radar, and/or lidar may be utilized to determine the position and/or proximity of one or more objects (e.g., other vehicles, barriers, etc.) in relation to the vehicle. This information may be utilized in conjunction with interior sensing to determine whether an occupant is nervous when driving next to a large truck.

Figure 4:
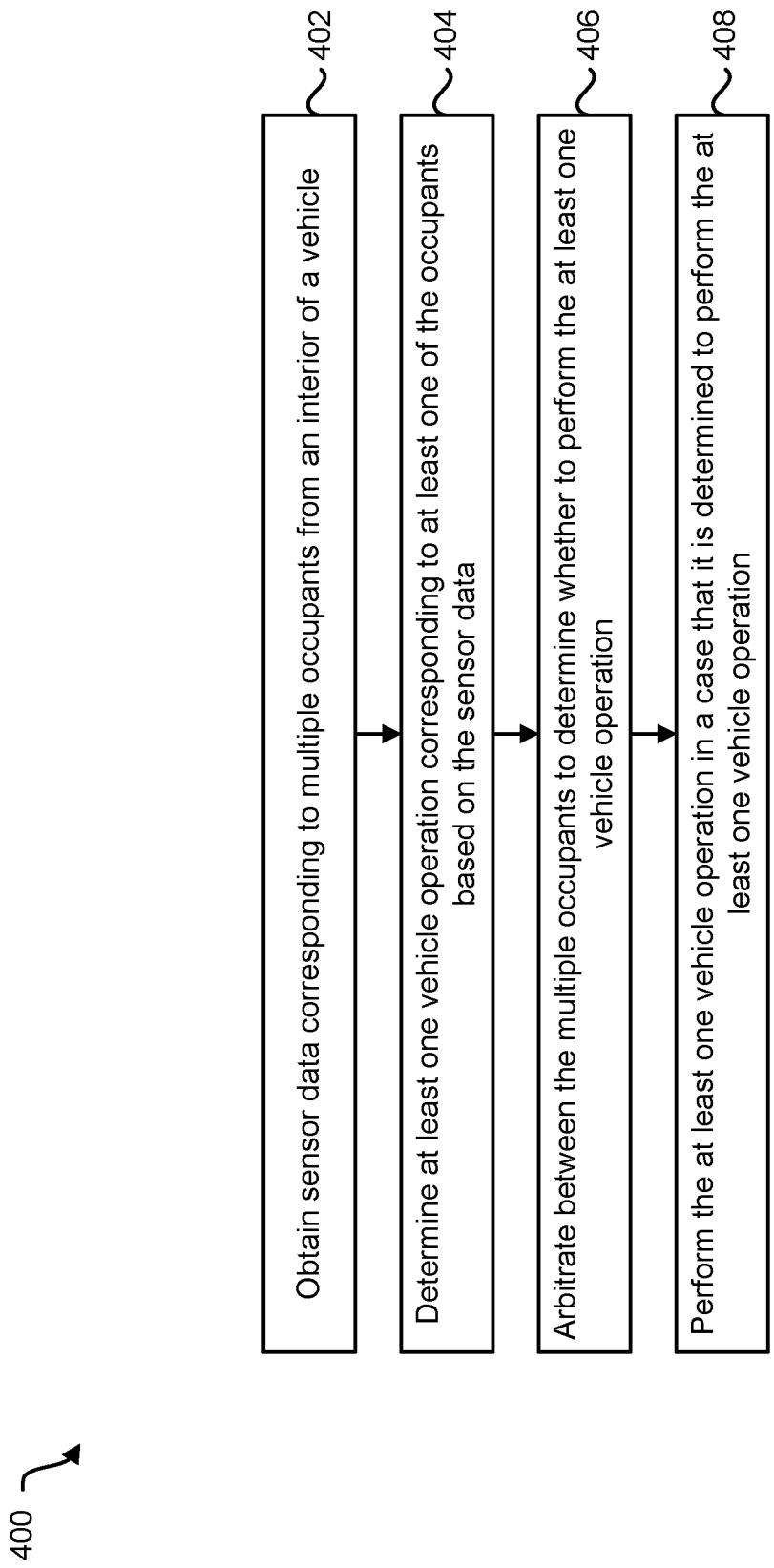
FIG. 4 is a flow diagram illustrating a more specific configuration of a method for operating a vehicle based on sensor data and/or cloud information.

FIG. 4 is a flow diagram illustrating a more specific configuration of a method 400 for operating a vehicle based on sensor data and/or cloud information. The method 400 may be performed by the electronic device 102 described in relation to FIG. 1, for example.

The electronic device 102 may obtain 402 sensor data corresponding to multiple occupants from an interior of a vehicle. This may be accomplished as described in relation to one or more of FIGS. 1-3 and 5-11. For example, the electronic device 102 may obtain sensor data from one or more integrated sensors and/or remote sensors that capture data corresponding to multiple occupants from an interior of a vehicle. For instance, the sensor data (e.g., image sensor data, wireless communication data, weight sensor data, depth sensor data, health sensor data, audio data, IR data, ultrasound data, and/or motion data, etc.) may include one or more sensor data types that may indicate an occupant status. The sensor data may correspond to multiple occupants. For example, the image sensor data may include images of two or more occupants (and/or possessions corresponding to two or more occupants), the weight sensor data may include weight sensor data for two or more occupants, the audio data may include audio sensor (e.g., microphone) data for two or more occupants, and/or the health sensor data may include health sensor data for two or more occupants, etc. Additionally or alternatively, the sensor data may include different sensor data types corresponding to different occupants. For example, the sensor data may include image sensor data for a first occupant and audio sensor data for a second occupant. In some configurations, the electronic device 102 may additionally or alternatively obtain sensor data from a vehicle exterior, vehicle information, and/or cloud information.

The electronic device 102 may determine 404 (e.g., identify) at least one vehicle operation corresponding to at least one of the occupants based on the sensor data. This may be accomplished as described in relation to one or more of FIGS. 1-2, 5-7, and 11. For example, the electronic device 102 may perform analysis on one or more images to determine occupant status for one or more occupants. The electronic device 102 may determine 404 one or more vehicle operations in response to the one or more occupant statuses. Additionally or alternatively, the electronic device 102 may determine 404 the one or more vehicle operations based on sensor data from a vehicle exterior, vehicle information, and/or cloud information (in addition to or alternatively from interior sensor data).

The electronic device 102 may arbitrate 406 between the multiple occupants to determine whether to perform the at least one vehicle operation. This may be accomplished as described in connection with one or more of FIGS. 1-2, 5, 7, and 9-11. For example, the electronic device 102 may determine a priority for each of the multiple occupants. The electronic device 102 may determine whether performing a vehicle operation corresponding to an occupant violates a preference of any other occupant with a higher priority. In a case that performing the vehicle operation does not violate a higher priority occupant preference, the electronic device 102 may determine to perform the vehicle operation. In a case that performing the vehicle operation violates a higher priority occupant preference, the electronic device 102 may determine to not perform the vehicle operation.

The electronic device 102 may perform 408 the at least one vehicle operation in a case that it is determined to perform the at least one vehicle operation. This may be accomplished as described in relation to one or more of FIGS. 1-3, 7, and 11. For example, the electronic device 102 may perform any of the vehicle operations that do not violate a preference of any higher priority occupant.

Figure 5:
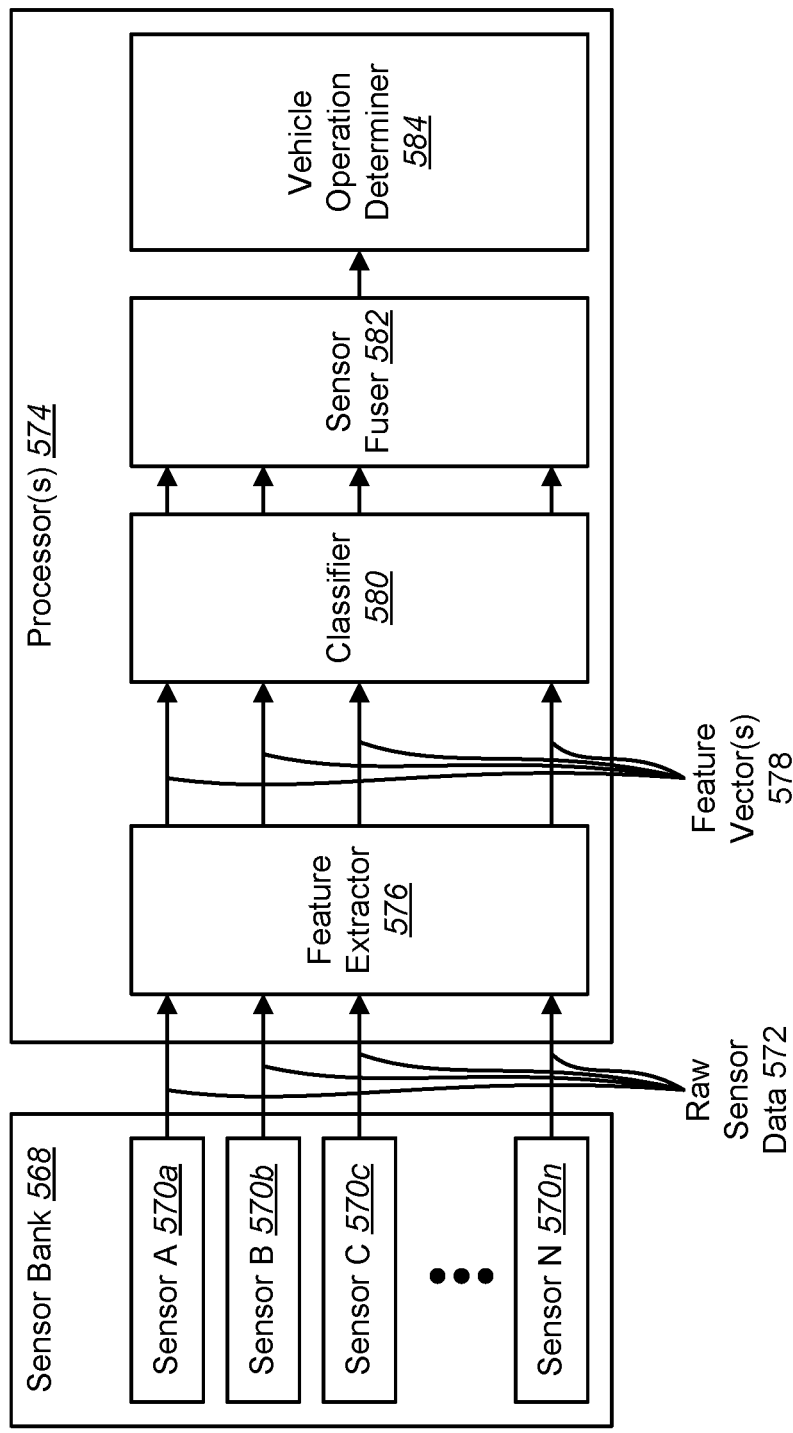
FIG. 5 is a block diagram illustrating an example of an approach for controlling vehicle operation based on sensor data.

FIG. 5 is a block diagram illustrating an example of an approach for controlling vehicle operation based on sensor data. In particular, FIG. 5 illustrates an example of state detection using machine learning. In some configurations, one or more of the elements or components described in relation to FIG. 5 may be implemented in the electronic device 102 described in connection with FIG. 1. FIG. 5 illustrates a sensor bank 568 and one or more processors 574. The sensor bank 568 may include a number of sensors 570a-n. One or more of the sensors 570a-n described in relation to FIG. 5 may be examples of one or more of the sensors described in relation to FIG. 1. Additionally or alternatively, one or more of the processor(s) 574 described in relation to FIG. 5 may be examples of the processor 112 described in relation to FIG. 1. In some configurations, the processor(s) 574 may include and/or implement a feature extractor 576, a classifier 580, a sensor fuser 582, and/or a vehicle operation determiner 584. In some implementations, the processor(s) 574 may include a central compute processor (e.g., a central processing unit (CPU)) in a vehicle. Additionally or alternatively, the processor(s) 574 may be a combination of distributed and central processing in a vehicle (e.g., a mix of processing performed in a vehicle and by one or more remote devices in the cloud).

In some configurations, each of the sensors 570a-n may be a different sensor type. The sensors 570a-n may produce raw sensor data 572. The raw sensor data 572 may be provided to the processor(s) 574 (e.g., to the feature extractor 576).

The feature extractor 576 may extract one or more features (e.g., feature vector(s) 578) from the raw sensor data 572. For example, feature extraction and classification may be performed for one or more sensor types. For instance, sensor A 570a may be a camera and the feature extractor 576 may include and/or perform computer vision analysis to produce one or more feature vectors 578. In some approaches, feature extraction for image data may include determining one or more characteristics (e.g., keypoints, visual patterns, corners, edges, shapes, etc.) of the image data. In some approaches, feature extraction for audio data may include determining one or more characteristics (e.g., pitch, pitch shape, voice activity detection, amplitude, energy, etc.) of the audio data. The characteristic(s) may be expressed as feature vector(s) 578. The one or more feature vectors 578 may be provided to the classifier 580.

The classifier 580 (e.g., machine learning classifier) may classify the feature vector(s) 578. For example, the classifier 580 may determine a class for each feature vector 578. For instance, the classifier 580 may classify a set of keypoints from image data as a face, as text (e.g., one or more text characters), and/or another kind of object (e.g., smartphone, purse, keys, glasses, book, food, etc.). Additionally or alternatively, the classifier 580 may classify pitch shape, voicing, energy, etc., of an audio signal as a particular sound, music, word, or phrase, etc.

The sensor fuser 582 may optionally perform fusion between the sensor types. For example, the sensor fuser 582 may combine the classified features into fused information. For instance, the fused information may indicate that an occupant said "cold," that the occupant is making a shivering motion, and/or that the occupant is tightly folding his or her arms.

In some configurations, the sensor fuser 582 may take the features identified by the different modalities and may weight across features, which may be fed into the final decision (e.g., the vehicle operation determination). For example, one or more of the classified features may be weighted more heavily than another classified feature. The fused information may be provided to the vehicle operation determiner 584.

The vehicle operation determiner 584 may determine one or more vehicle operations based on the fused information. For example, the vehicle operation determiner 584 may select one or more vehicle operation in order to address one or more occupant conditions indicated by the fused information. For instance, fused information indicating that an occupant is uncomfortably cold may map to increasing cabin temperature, fused information indicating that an occupant is sleeping may map to decreasing cabin lighting, fused information indication that an occupant is uncomfortable with a following distance may map to decreasing vehicle speed to increase the following distance, etc.

In some configurations, the procedures illustrated in FIG. 5 may be performed for one or more occupants. Arbitration may also be performed across occupant priorities. In some approaches, for example, another procedure may be performed to arbitrate between occupants. For instance, the procedures illustrated in FIG. 5 may be performed for multiple occupants and the processor(s) 574 may arbitrate between the occupants to produce a decision. For example, the sensor fuser 582 and/or the vehicle operation determiner 584 may perform arbitration.

An example of the operation of the sensor bank 568 and the processor(s) 574 is given as follows. In this example, the vehicle (e.g., car) is driving next to a larger truck or a barrier. Machine learning may compute a state for each modality (e.g., each sensor type) and may fuse the results. The vehicle may determine occupant discomfort. In some configurations, the vehicle may ask the occupant whether a lane should be changed. Based on an occupant response (e.g., verbal response, button push, screen tap, gesture detection), the vehicle may react accordingly (e.g., change lanes if indicated).

In some configurations, feature extraction, classification, sensor fusion, and/or decision (e.g., vehicle operation determination) may be performed in accordance with one or more aspects of the following. Machine learning may be performed for occupant emotion, health state, priority, and/or or preference. One or more of these trait measurements may be obtained through a machine learning operation.

One or more features may be extracted (by the feature extractor 576, for example) and/or combined from each sensor 570a-n. Classification may be performed (by the classifier 580, for example) for each modality and then fusion may be conducted (by the sensor fuser 582, for example) based on all sensor outputs (e.g., raw sensor data 572). Based on the fusion result, the respective decision outcome (e.g., vehicle operation) for each measured trait (e.g., emotion, health state, and/or priority preference) may be determined.

A training step may be performed offline using data on each of the measured traits to learn one or more models. The learned model(s) may be saved for usage online. Detection or decision making may be performed online with the stored offline models from training.

Deep learning may be utilized to perform (e.g., replace) one or more of feature extraction, classification and sensor fuser. For example, deep learning may be utilized to perform all or any combination of feature extraction, classification, and sensor fusion. For instance, deep learning based techniques may be used as a feature extractor only, as a feature extractor and classifier, or as a feature extractor, classifier, and fuser.

Classification engines (e.g., the classifier 580, a machine learning classifier, etc.) may be updated with one or more remote devices (e.g., using one or more network devices, using the cloud, etc.) to improve accuracy if a fault is detected and marked by occupants (e.g., users and/or passengers). This may reduce fault occurrence over time.

Figure 6:
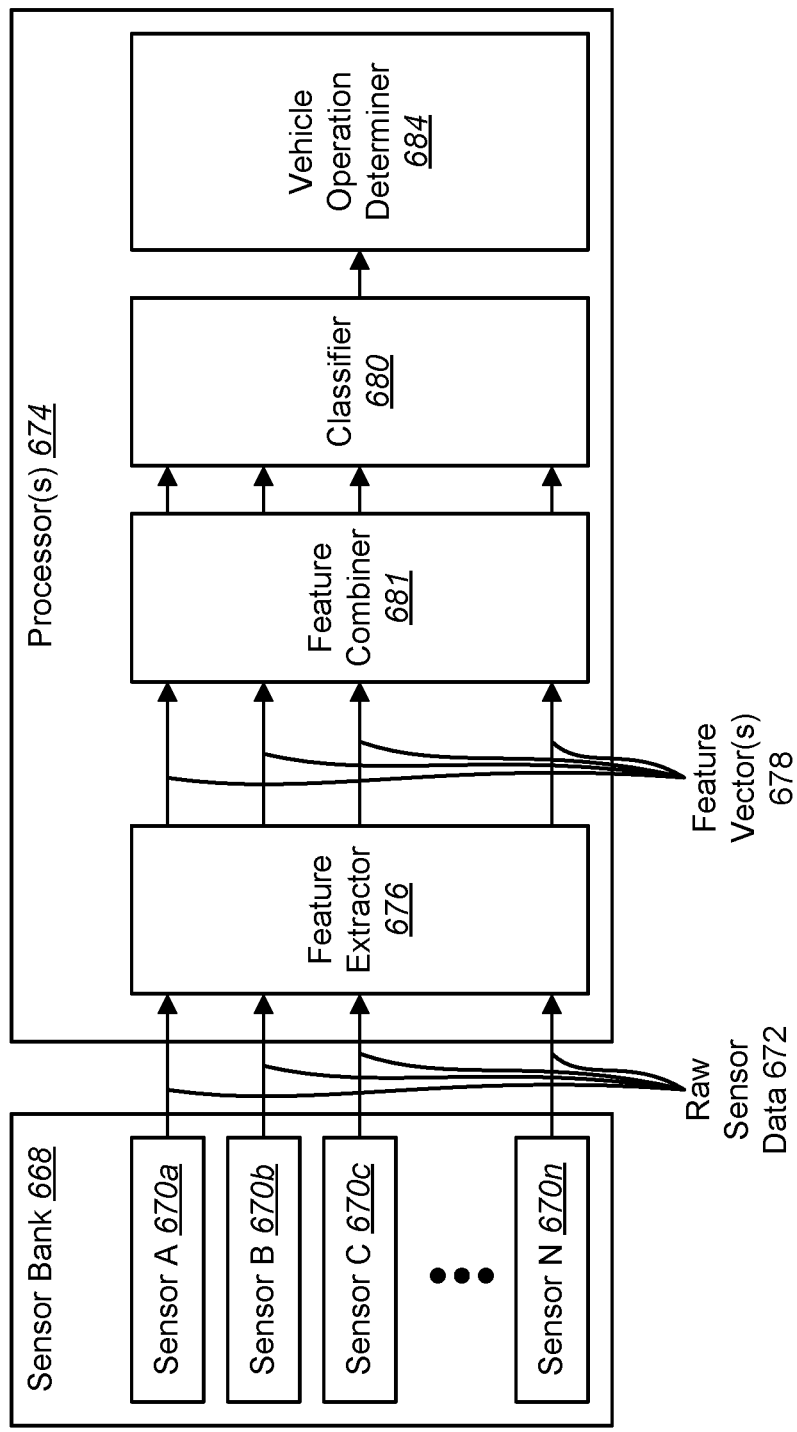
FIG. 6 is a block diagram illustrating an example of another approach for controlling vehicle operation based on sensor data.

FIG. 6 is a block diagram illustrating an example of another approach for controlling vehicle operation based on sensor data. In some configurations, one or more of the elements or components described in relation to FIG. 6 may be implemented in the electronic device 102 described in connection with FIG. 1. FIG. 6 illustrates a sensor bank 668 and one or more processors 674. The sensor bank 668 may include a number of sensors 670a-n. The sensors 670a-n may produce raw sensor data 672, which may be provided to the processor(s) 674. One or more of the sensors 670a-n described in relation to FIG. 6 may be examples of one or more of the sensors described in relation to FIG. 1. Additionally or alternatively, one or more of the processor(s) 674 described in relation to FIG. 6 may be examples of the processor 112 described in relation to FIG. 1. In some configurations, the processor(s) 674 may include and/or implement a feature extractor 676, a feature combiner 681, a classifier 680, and/or a vehicle operation determiner 684. In some implementations, the processor(s) 674 may include a central compute processor (e.g., a central processing unit (CPU)) in a vehicle. Additionally or alternatively, the processor(s) 674 may be a combination of distributed and central processing in a vehicle (e.g., a mix of processing performed in a vehicle and by one or more remote devices in the cloud).

In some configurations, sensor (e.g., information) fusion may be performed in accordance with one or more aspects of the following. Sensor or information fusion may be utilized to combine the results from several classification engines and/or sensors 670a-n. In one example, sensor fusion may be performed as a weighted average, where weights can be determined experimentally. In another example, sensor fusion may be performed as a weighted average, where an additional classification engine may be implemented and/or utilized to learn the weights (e.g., optimal weights) that combine the results of all classifiers. In yet another example, sensor fusion may be performed directly on the features. For instance, the processor 674 may combine or append the feature vectors 678 from different sensors 670a-n using a feature combiner 681 and may also use a classifier 680 (e.g., machine learning (ML) classifier). FIG. 6 illustrates an alternative approach to the approach described in connection with FIG. 5.

Figure 7:
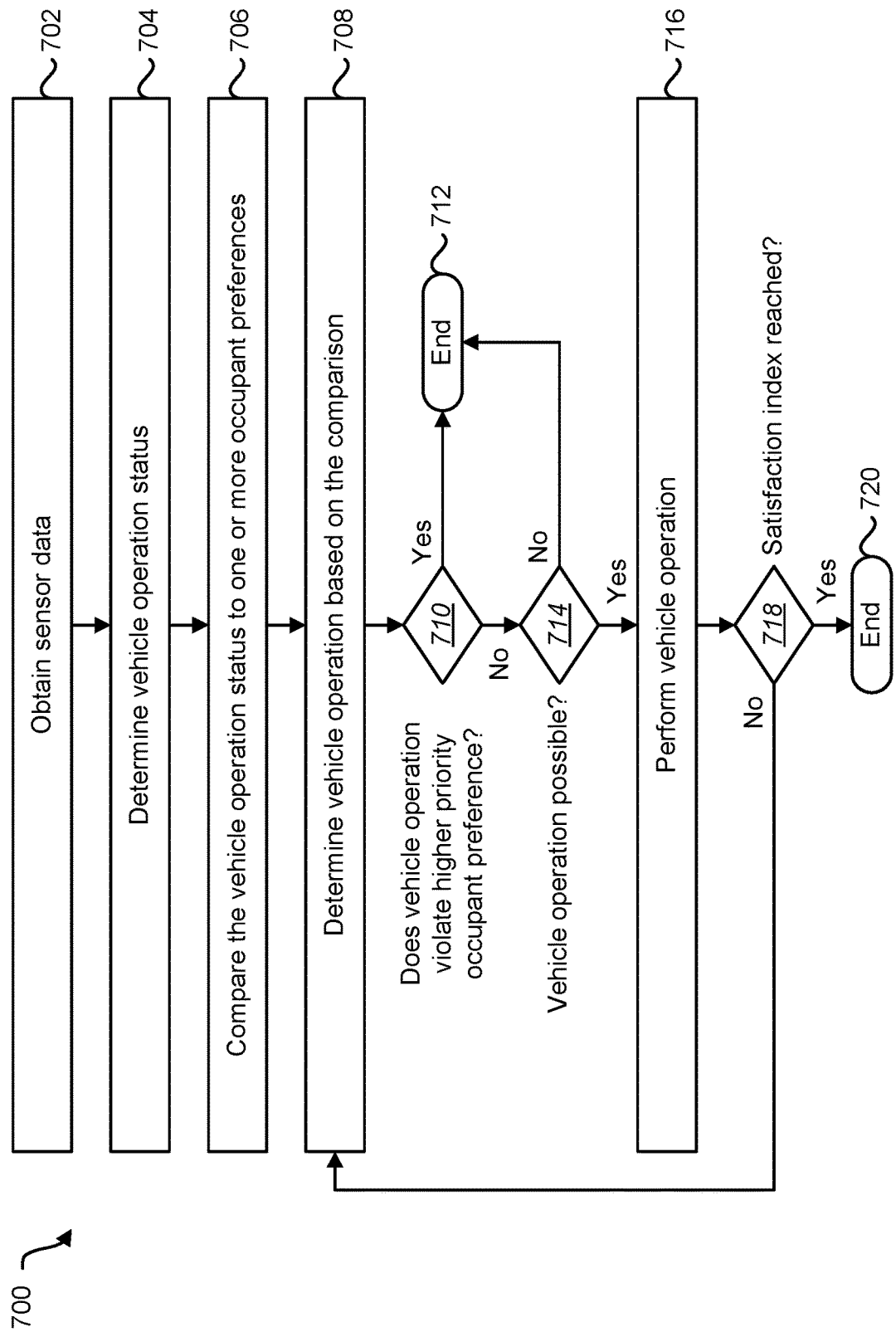
FIG. 7 is a flow diagram illustrating an example of a method for operating a vehicle based on sensor data.

FIG. 7 is a flow diagram illustrating an example of a method 700 for operating a vehicle based on sensor data. The method 700 may be performed by the electronic device 102 described in relation to FIG. 1. For example, the method 700 may include determining an action (e.g., vehicle operation) based on sensor data.

The electronic device 102 may obtain 702 sensor data (e.g., sensor inputs, auditory input, gestures, etc.). This may be accomplished as described in relation to one or more of FIGS. 1-6.

The electronic device 102 may determine 704 vehicle operation status. This may be accomplished as described in relation to FIG. 1. For example, the sensor data may be utilized to determine one or more aspects of vehicle operation (e.g., cabin temperature, HVAC settings, vehicle speed, following distance, cabin lighting settings, lock status, window status, door status, etc.).

The electronic device 102 may compare 706 the vehicle operation status to one or more occupant preferences. For example, the electronic device 102 may compare one or aspects of vehicle operation to one or more occupant preferences. For instance, the electronic device 102 may determine whether a cabin temperature is within range of an occupant preference.

In some configurations, the electronic device 102 may determine an occupant status for each occupant (e.g., occupant 1, occupant 2, . . . , occupant n, etc.). For example, the electronic device 102 (e.g., vehicle) may obtain video data and perform computer vision processing that indicates that one of the occupants (e.g., a passenger) is cold and shivering and that another occupant is neutral. Additionally or alternatively, the electronic device 102 may obtain audio data and perform speech recognition and natural language processing to determine that another occupant (e.g., the driver) is uncomfortably warm (e.g., may recognize speech where an occupant says "it's hot in here."). In some configurations, the occupant status determination may be utilized to determine occupant preferences. For example, a temperature at which an occupant is shivering may be considered below a low temperature preference threshold for the occupant. Some configurations may enable performing a vehicle operation (e.g., action) depending on measured and/or detected state (e.g., occupant state and/or vehicle operation status).

In some approaches, the electronic device 102 may compare 706 the vehicle operation status to one or more (e.g., multiple) occupant preferences. For example, the electronic device 102 may determine whether each occupant is comfortable or uncomfortable with the temperature. For instance, each occupant may prefer a particular temperature range. Each occupant may have a corresponding preference for one or more aspects of vehicle operation. Examples of preferences may include threshold temperature ranges, lighting preferences, driving preferences (e.g., following distance, proximity to a vehicle in an adjacent lane, driving speed (e.g., maximum, moderate, slow, etc., relative to a speed limit), etc.), music volume, etc.

The electronic device 102 may determine 708 a vehicle operation based on the comparison. For example, the electronic device 102 may evaluate whether an action is needed (e.g., may determine one or more potential vehicle operations for each of the occupants). For example, an indication that the cabin temperature is below an occupant preference and/or an indication an occupant is shivering may map to determining an action of increasing the temperature (e.g., activating a heater or increasing heating). The indication that an occupant is too hot may map to determining an action of decreasing the temperature (e.g., deactivating a heater and/or activating air conditioning).

The electronic device 102 may determine 710 whether the vehicle operation violates a higher priority occupant preference. For example, the electronic device 102 may determine whether a vehicle operation can be performed without violating a higher priority occupant preference and/or which vehicle operation takes priority. In some approaches, one or more occupants may be designated to have a higher priority. For example, the electronic device 102 may learn that a particular occupant's (e.g., occupant 2's, a passenger's, etc.) comfort takes priority over that of occupant 1 (e.g., the driver). For instance, this may be learned by earlier observation (e.g., occupant 2 generally gets to set the temperature without objection from occupant 1) and/or from user settings and/or inputs. Accordingly, the electronic device 102 may arbitrate between occupants on which operation to perform.

In a case that the vehicle operation violates a higher priority occupant preference (e.g., in a case that there is a higher priority occupant with a corresponding preference that would be violated by performing the vehicle operation), operation may end 712. For example, if performing the vehicle operation would make a higher priority occupant uncomfortable, the electronic device 102 may do nothing (e.g., reject the determined action). For instance, if a lower-priority occupant (e.g., a child) wants a window opened, but this would violate the preference of a higher priority occupant (e.g., an adult), the electronic device 102 may determine to not perform the vehicle operation.

In a case that the vehicle operation does not violate a higher priority occupant preference (e.g., there is no higher priority occupant and/or performing the vehicle operation may satisfy a lower-priority occupant without violating the preference of higher-priority occupant), the electronic device 102 may determine 714 whether the vehicle operation is possible. For example, the electronic device 102 may check surrounding conditions (with sensor(s) and/or machine learning, for instance) to determine whether a lane change is possible in order to distance the vehicle from a large truck in an adjacent lane. The lane change may be possible if another adjacent lane is open (and/or changing lanes would not cause a collision).

In a case that the vehicle operation is not possible (e.g., air conditioning cannot be increased, a lane change may not be performed, lighting cannot be increased, etc.), operation may end 712 (e.g., the electronic device 102 may abort any change(s) and/or may not perform the vehicle operation(s)).

In a case that the action is possible, the electronic device 102 may perform 716 the vehicle operation. For example, the electronic device 102 may send the determined operation command (e.g., operation instruction, action command, etc.) to a controller (e.g., to a vehicle operation manager).

The electronic device 102 may determine 718 whether a satisfaction index is reached (upon performing the vehicle operation, for example). For instance, the electronic device 102 may determine whether the vehicle operation status satisfies one or more occupant preferences (e.g., cabin temperature is within the preferred range). Additionally or alternatively, the electronic device 102 may observe after an amount of time, whether a cold occupant has stopped shivering. If the satisfaction index is not reached, the electronic device 102 may further determine 708 one or more potential vehicle operations (e.g., increase the heat more). If the satisfaction index is reached, operation may end 720. In some configurations, the electronic device 102 may continue to monitor the occupant status to determine whether to perform further or different operations.

Some configurations of the systems and methods disclosed herein may provide one or more operation changes to increase (e.g., maximize) occupant (e.g., passenger) satisfaction level. To find the best operation mode inside a vehicle (e.g., car), some approaches may find a setting that increases (e.g., maximizes) the comfort of all occupants (e.g., passengers) while still preserving the priority order. In some configurations, this may be accomplished as described in connection with FIG. 7.

Figure 8:
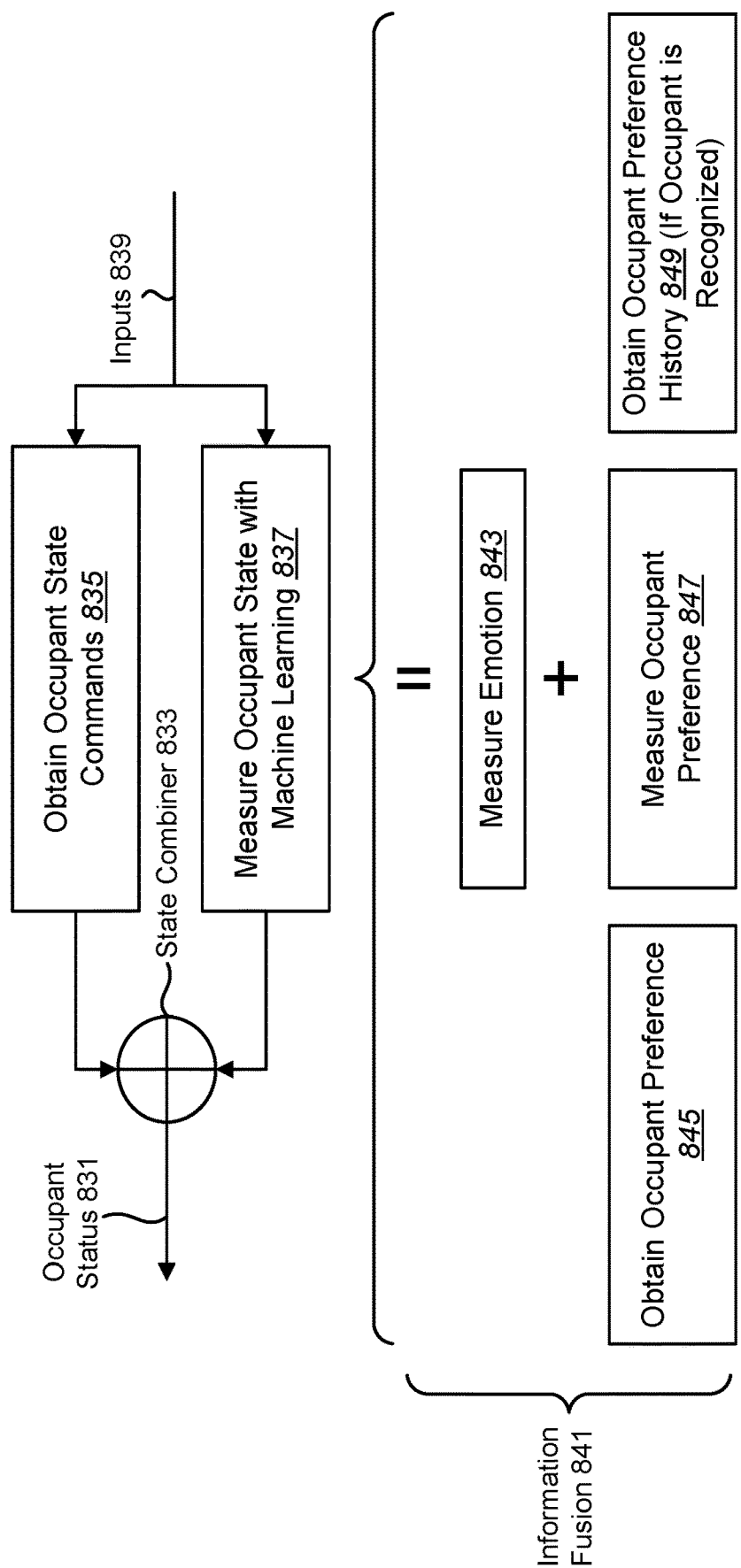
FIG. 8 is a block diagram illustrating an example of functions for determining occupant state.

FIG. 8 is a block diagram illustrating an example of functions for determining occupant (e.g., passenger) status 831. One or more of the functions described in connection with FIG. 8 may be performed by the electronic device 102 (e.g., processor 112, sensor data obtainer 116, and/or vehicle operation determiner 124) described in connection with FIG. 1.

The electronic device 102 (e.g., processor 112) may obtain one or more inputs 839. Examples of inputs 839 include sensor inputs (e.g., sensor data), auditory inputs, and/or gestures, etc., as described herein. For instance, a sensor bank may provide measurement data (e.g., all measurement data). Additionally or alternatively, one or more input interfaces (e.g., touch screens, speech recognition, buttons, etc.) may be utilized to receive user input. In some configurations, the sensor bank may include one or more input interfaces.

One or more inputs 839 may be utilized to obtain 835 (e.g., read and/or listen to, etc.) occupant state commands. For example, the state (e.g., status) of the occupant (e.g., passenger) can be inputted by an occupant to override an automatic decision (as needed or desired, for example).

One or more inputs 839 may be utilized to measure 837 occupant state with machine learning. In some configurations, the occupant (e.g., driver, passenger, etc.) state may be determined in accordance with one or more of the following aspects. The state of the occupant may be obtained by measuring various traits for each occupant using the sensor data and/or history. Such traits may include emotion and occupant preference. For example, machine learning may be used in determining emotion and occupant preference.

In some configurations, the electronic device 102 may measure 843 emotion. Regarding emotion, for instance, machine learning may use sensor inputs to recognize the emotion of an occupant such as fear, cold, discomfort, etc. This may be accomplished as described in connection with one or more of FIGS. 5-6.

Regarding occupant preference, for instance, occupant priority can be obtained using one or more techniques. Machine learning can learn the habit(s) of each occupant over time. This may be accomplished as described in connection with one or more of FIGS. 5-6.

In some approaches, occupant preference may be obtained 849 (e.g., fetched) from a history of an occupant (once the occupant is recognized, for example). The history may be stored locally and/or remotely (e.g., on a remote server, at a public website, at a social media website, etc.). Additionally or alternatively, occupant preference may be obtained 845 (e.g., inputted) directly by an occupant (e.g., passenger or driver) or read from an occupant profile directly. Additionally or alternatively, occupant preference may be measured 847. The electronic device 102 (e.g., processor 112, sensor data obtainer 116, and/or vehicle operation determiner 124) may perform information fusion 841 to measure 837 occupant state with machine learning. For example, the electronic device 102 may fuse occupant preference and occupant emotion to measure 837 the occupant state.

In some configurations, a state combiner 833 may be implemented and/or utilized to combine one or more obtained 835 occupant states and one or more measured 837 occupant states. For example, an obtained 835 (e.g., directly inputted, received, etc.) occupant state may add to or override a measured 837 occupant state. Combining one or more obtained 835 occupant states and one or more measured 837 occupant states may produce an occupant status 831 (e.g., final occupant state, determined occupant state, output occupant state, etc.). It should be noted that occupant status 831 may be characterized in a variety of ways (e.g., comfort scale, state type, etc.). For example, occupant (e.g., passenger) state can range from comfortable, to neutral, to mildly uncomfortable, to strongly uncomfortable, etc.

Figure 9:
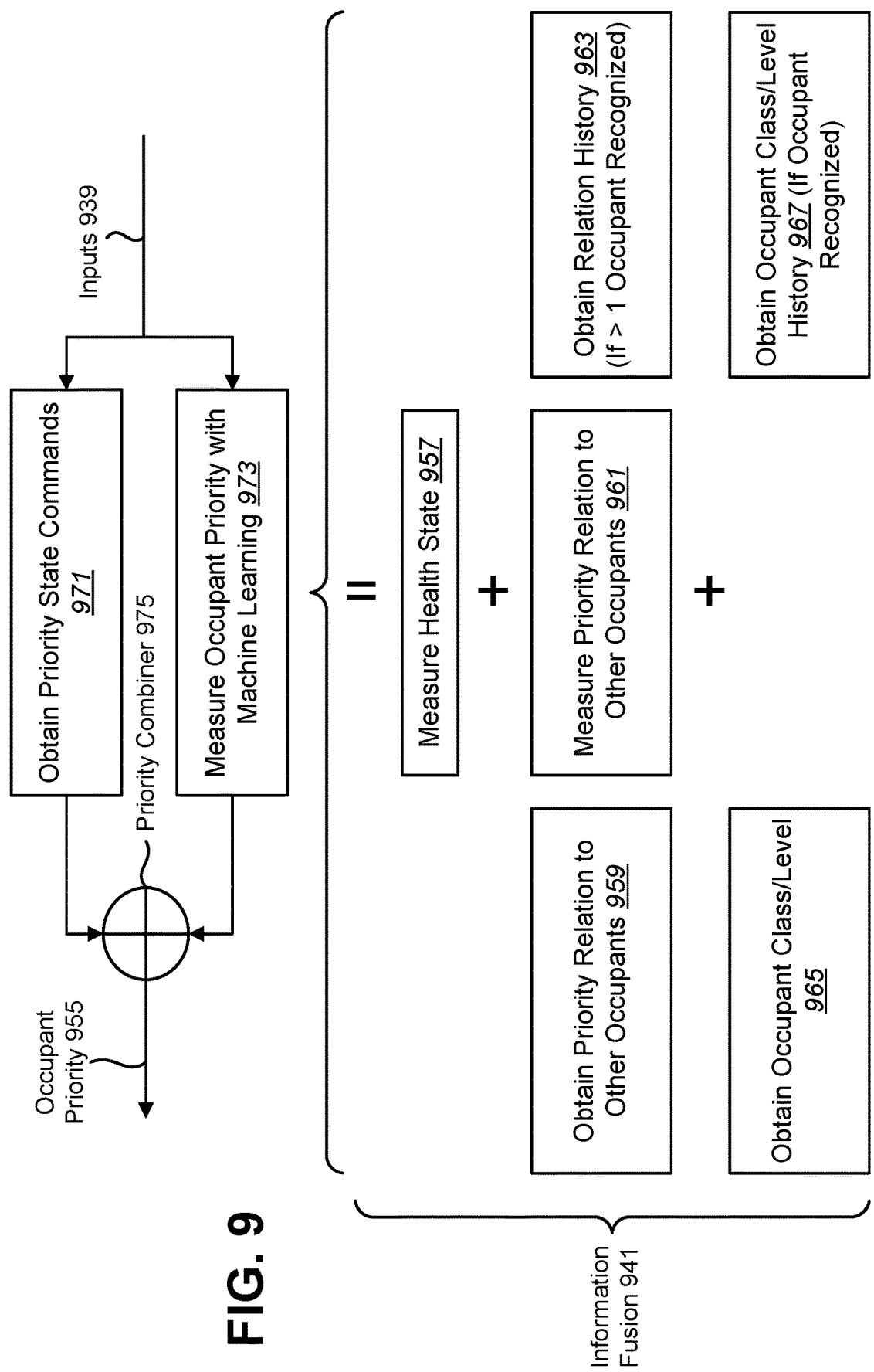
FIG. 9 is a block diagram illustrating an example of functions for determining occupant priority.

FIG. 9 is a block diagram illustrating an example of functions for determining occupant (e.g., passenger) priority. One or more of the functions described in connection with FIG. 9 may be performed by the electronic device 102 (e.g., processor 112, sensor data obtainer 116, and/or vehicle operation determiner 124) described in connection with FIG. 1.

The electronic device 102 (e.g., processor 112) may obtain one or more inputs 939. Examples of inputs 939 include sensor inputs (e.g., sensor data), auditory inputs, and/or gestures, etc., as described herein. For instance, a sensor bank may provide measurement data (e.g., all measurement data). Additionally or alternatively, one or more input interfaces (e.g., touch screens, speech recognition, buttons, etc.) may be utilized to receive user input. In some configurations, the sensor bank may include one or more input interfaces.

One or more inputs 939 may be utilized to obtain 971 (e.g., read and/or listen to, etc.) priority state commands. For example, the priority (e.g., rank) of the occupant (e.g., passenger) can be inputted by an occupant to override an automatic decision (as needed or desired, for example). For example, this may occur in case of an urgent situation or in a case where priority has been waived.

One or more inputs 939 may be utilized to measure 973 occupant priority with machine learning. In some configurations, the occupant (e.g., driver, passenger, etc.) priority may be determined in accordance with one or more of the following aspects. The priority of the occupant may be obtained by measuring various traits for each occupant using the sensor data and/or history. Such traits may include health state and occupant priority relation. For example, machine learning may be used in determining health state and occupant priority relation.

In some configurations, the electronic device 102 may measure 957 health state. Regarding health state, for instance, machine learning may use sensor inputs to recognize the health state of an occupant such as sickness or an urgent medical situation (e.g., heart attack, stroke, etc.), etc. This may be accomplished as described in connection with one or more of FIGS. 5-6.

Regarding occupant (e.g., passenger) priority relation, for instance, occupant priority can be obtained using one or more techniques. Machine learning can learn the relation between different passengers. For example, certain individuals may take priority over others. The priority may be systematic or arbitrary. For instance, priority may be determined based on activity (e.g., driver vs. passenger), age, military rank, title (e.g., husband or wife priority) per group or household, etc. This may be accomplished as described in connection with one or more of FIGS. 5-6.

In some approaches, occupant priority relation with different occupants may be obtained 963 (e.g., fetched) from a history (if more than one occupant is recognized, for example). For instance, person and/or facial recognition may be employed to determine each of the occupants. The history may be stored locally and/or remotely. Additionally or alternatively, occupant priority relation may be obtained 959 (e.g., inputted) directly by an occupant (e.g., passenger or driver). For example, relation priority with different occupants can be inputted directly by occupants. In some approaches, a priority may be waived. For example, one individual (e.g., driver) may waive a right to another individual (e.g., driver to passenger, parent to child, spouse to spouse, etc.). Additionally or alternatively, the occupant priority relation may be obtained from a public profile (e.g., a remote server, a social media website, public website, etc.). Additionally or alternatively, occupant priority relation may be measured 961.

In some configurations, occupants may belong to different classes. For example, gold frequent rider, silver frequent rider, first class, coach, etc. For instance, the electronic device 102 may obtain 965 (e.g., read) the occupant class from direct input and/or may obtain 967 (e.g., fetch) the occupant class history (if the occupant is recognized, for example). The classes may be determined from a profile and/or history of the occupant (e.g., locally and/or from a remote device).

Occupant priority (e.g., rank) can be determined as the rank or importance among different passengers. The higher the rank, the more likely the occupant will be satisfied.

The electronic device 102 (e.g., processor 112, sensor data obtainer 116, and/or vehicle operation determiner 124) may perform information fusion 941 to measure 973 occupant priority with machine learning. For example, the electronic device 102 may fuse occupant priority relation and occupant health state to measure 973 the occupant priority.

In some configurations, a priority combiner 975 may be implemented and/or utilized to combine one or more obtained 971 priority states and one or more measured 973 occupant priorities. For example, an obtained 971 (e.g., directly inputted) occupant priority may add to or override a measured 973 occupant priority. Combining one or more obtained 971 priority states and one or more measured 973 occupant priorities may produce an occupant priority 955 (e.g., final occupant priority, determined occupant priority, output occupant priority, occupant rank, etc.). It should be noted that occupant priority 955 may be characterized in a variety of ways (e.g., numerical scale, priority type, etc.). For example, occupant (e.g., passenger) priority 955 can range from a top priority (e.g., 1) to a bottom priority (e.g., last among all occupants), etc.

Figure 10:
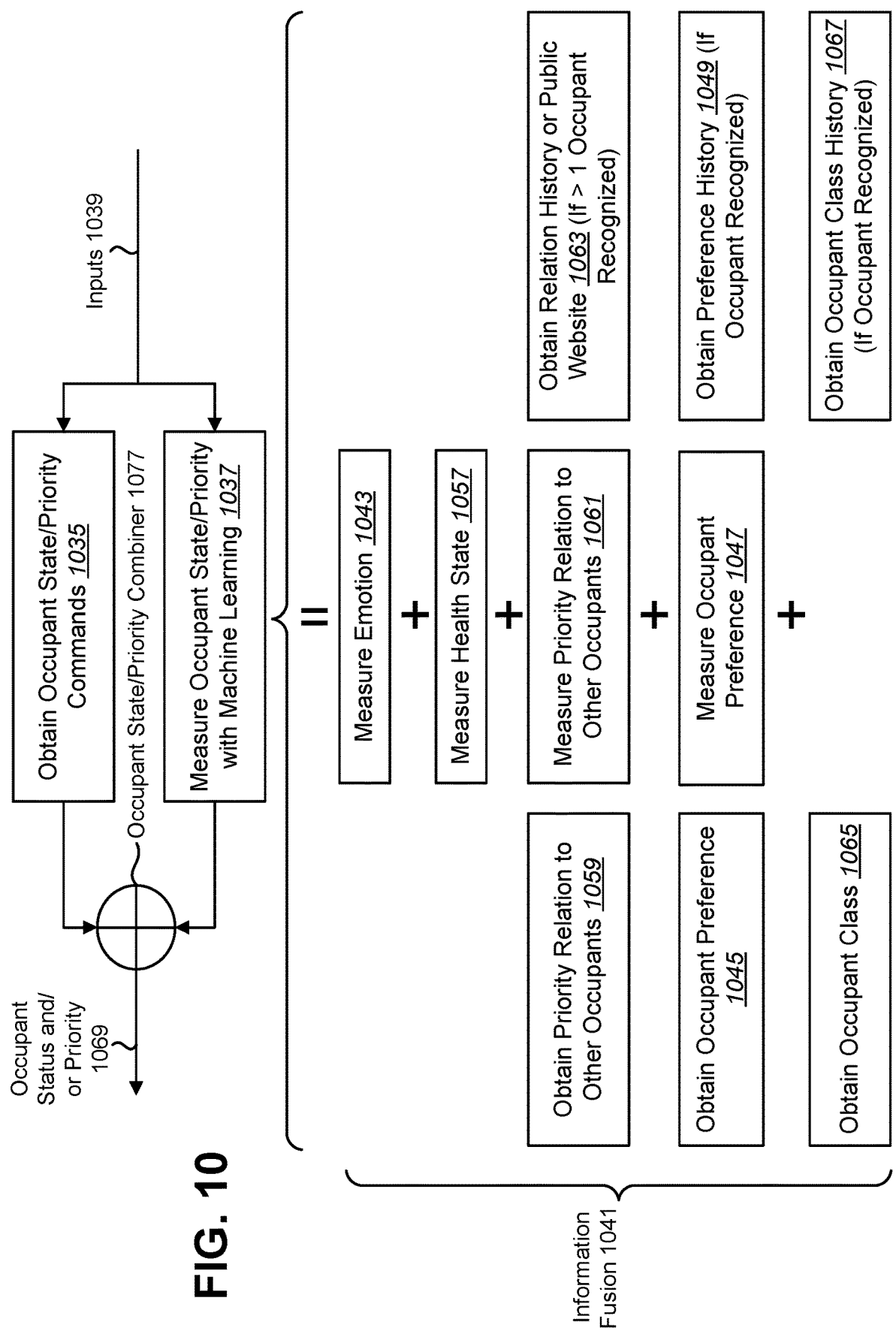
FIG. 10 is a block diagram illustrating an example of functions for determining occupant state and priority.

FIG. 10 is a block diagram illustrating an example of functions for determining occupant (e.g., passenger) status and priority 1069. In the example described in connection with FIG. 10, occupant state and priority (e.g., rank) determinations are combined (e.g., bundled). For instance, occupant state and priority may be determined in a combined fashion as described in connection with FIG. 10. One or more of the functions described in connection with FIG. 10 may be performed by the electronic device 102 (e.g., processor 112, sensor data obtainer 116, and/or vehicle operation determiner 124) described in connection with FIG. 1.

The electronic device 102 (e.g., processor 112) may obtain one or more inputs 1039. Examples of inputs 1039 include sensor inputs (e.g., sensor data), auditory inputs, and/or gestures, etc., as described herein (e.g., measurement data and/or input interface data).

One or more inputs 1039 may be utilized to obtain 1035 (e.g., read and/or listen to, etc.) occupant state and/or priority commands. For example, the electronic device 102 may obtain occupant state and/or priority commands as described in connection with one or more of FIGS. 8-9.

One or more inputs 1039 may be utilized to measure 1037 occupant state and/or priority with machine learning. In some configurations, the occupant (e.g., driver, passenger, etc.) state and/or occupant priority may be determined in accordance with one or more of the following aspects. The state of the occupant and/or occupant priority may be obtained by measuring various traits for each occupant using the sensor data and/or history. Such traits may include emotion, occupant preference, health state, and/or occupant priority relation. For example, machine learning may be used in determining emotion, occupant preference, health state, and/or occupant priority relation.

In some configurations, the electronic device 102 may measure 1043 emotion and/or may measure 1057 health state. This may be accomplished as described in connection with one or more of FIGS. 8-9.

Regarding occupant (e.g., passenger) priority relation, for instance, occupant priority can be obtained using one or more techniques. This may be accomplished as described in connection with FIG. 9. For example, occupant priority relation with different occupants may be obtained 1063 (e.g., fetched) from a history (if more than one occupant is recognized, for example). Additionally or alternatively, the occupant priority relation may be obtained from a public profile (e.g., a remote server, a social media website, public website, etc.). Additionally or alternatively, occupant priority relation may be obtained 1059 (e.g., inputted) directly by an occupant. Additionally or alternatively, occupant priority relation may be measured 1061.

Regarding occupant preference, for instance, occupant priority can be obtained using one or more techniques. This may be accomplished as described in connection with FIG. 8. For example, occupant preference may be obtained 1049 (e.g., fetched) from a history of an occupant (once the occupant is recognized, for example). The history may be stored locally and/or remotely. Additionally or alternatively, occupant preference may be obtained 1045 (e.g., inputted) directly by an occupant (e.g., passenger or driver) or read from an occupant profile directly. Additionally or alternatively, occupant preference may be measured 1047.

The electronic device 102 may obtain 1065 (e.g., read) the occupant class (e.g., level) from direct input and/or may obtain 1067 (e.g., fetch) the occupant class history (if the occupant is recognized, for example). This may be accomplished as described in connection with FIG. 9.

The electronic device 102 (e.g., processor 112, sensor data obtainer 116, and/or vehicle operation determiner 124) may perform information fusion 1041 to measure 1037 occupant state and/or occupant priority with machine learning. For example, the electronic device 102 may fuse occupant emotion, health state, priority, preference, and/or class to measure 1037 the occupant state and/or priority.

In some configurations, an occupant state and/or priority combiner 1077 may be implemented and/or utilized to combine one or more obtained 1035 occupant and/or priority states and one or more measured 1037 occupant and/or priority states to produce an occupant status and/or priority 1069 (e.g., final occupant state and/or priority, output occupant state and/or priority, etc.). For example, an obtained 1035 (e.g., directly inputted) occupant state and/or priority may add to or override a measured 1037 occupant state and/or priority.

Figure 11:
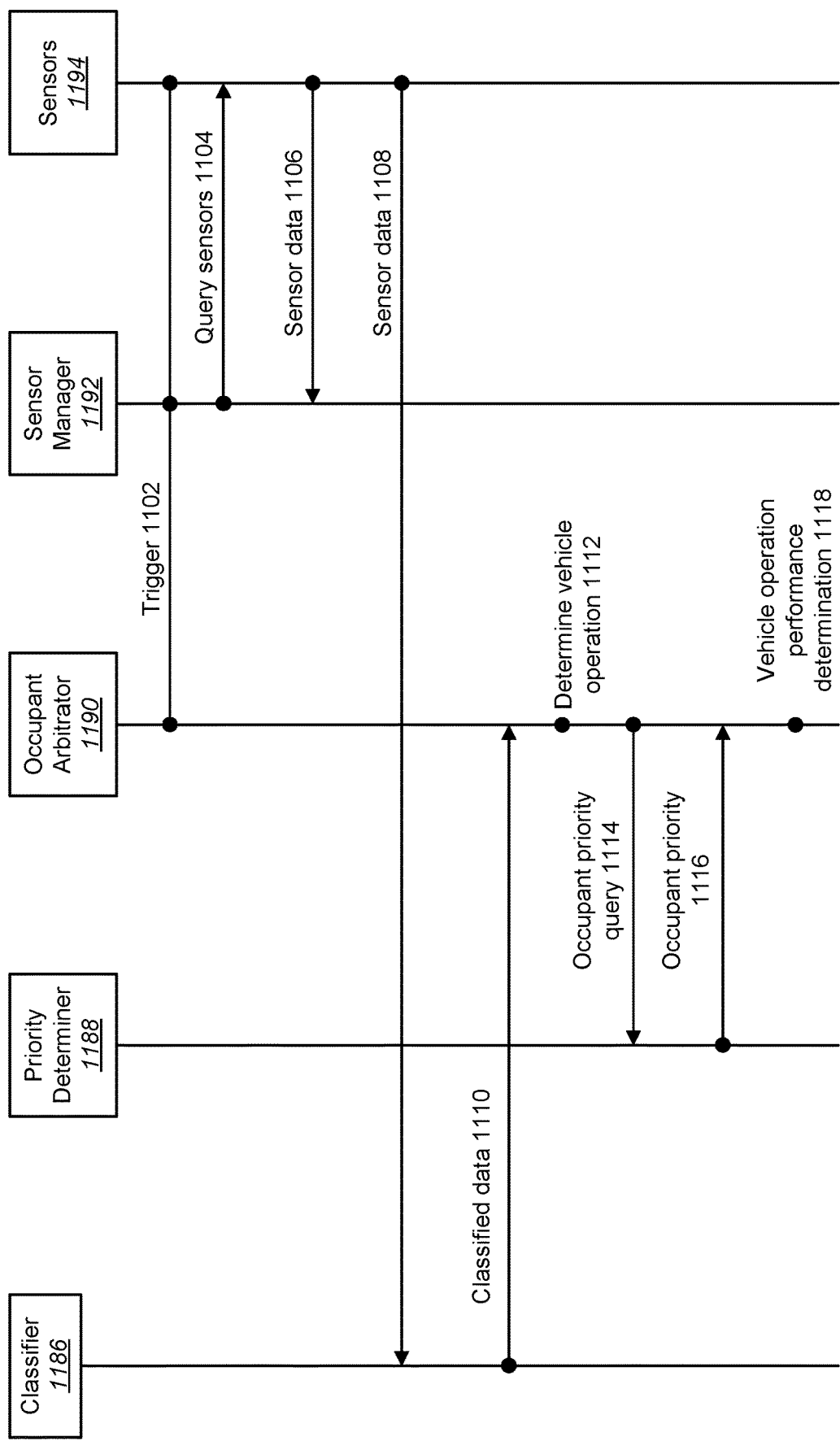
FIG. 11 is a thread diagram illustrating examples of vehicle operation control.

FIG. 11 is a thread diagram illustrating examples of vehicle operation control (e.g., operation mode change). FIG. 11 illustrates a classifier 1186, a priority determiner 1188, an occupant arbitrator 1190, a sensor manager 1192, and sensors 1194. One or more of the elements described in connection with FIG. 11 may be implemented in the electronic device 102 described in relation to FIG. 1. In particular, two examples are described in connection with FIG. 11: vehicle operation rejection and vehicle operation acceptance.

As illustrated, a trigger 1102 may occur. The trigger 1102 may occur and/or may be detected in a variety of ways, depending on the configuration. For example, an occupant may intentionally trigger the occupant arbitrator 1190, the sensor manager 1192, and/or the sensors 1194. For example, the occupant may press a button, tap a touch screen, or utter an intentional speech command (e.g., "car, check the temperature"). Additionally or alternatively, the sensors 1194 may detect a trigger (e.g., an unintentional trigger). For example, an occupant may lean away from a car window, may say something (e.g., "it's cold"), or may open the door to exit the vehicle, etc. Accordingly, the trigger 1102 may be intentional (e.g., an occupant telling the vehicle to do something) or may be observed after invoking Machine Learning (ML).

Upon trigger detection, the sensor manager 1192 may query 1104 one or more sensors 1194 for sensor data. The sensor(s) 1194 may provide sensor data 1106 to the sensor manager 1192 and/or may provide sensor data 1108 to the classifier 1186.

The classifier 1186 may classify the sensor data 1108. For example, the classifier may classify one or more feature vectors based on the sensor data 1108 to produce classified data 1110. The classified data 1110 may indicate an occupant status (e.g., whether the occupant is uncomfortable, cold, anxious, excited, etc.). Additionally or alternatively, the classified data 1110 may indicate may indicate a vehicle operation status (e.g., proximity to another vehicle or barrier, following distance, etc.). The classified data 1110 may be provided to the occupant arbitrator 1190.

The occupant arbitrator 1190 may determine 1112 a vehicle operation. For example, the occupant arbitrator 1190 may determine whether performing or changing a vehicle operation may improve or satisfy the occupant status indicated by the classified data 1110. In a case that a vehicle operation may address (e.g., improve, satisfy, etc.) the occupant status, the occupant arbitrator may send an occupant priority query 1114 to the priority determiner 1188.

The priority determiner 1188 may determine one or more occupant priorities. The priority determiner 1188 may provide one or more occupant priorities 1116 to the occupant arbitrator 1190.

The occupant arbitrator 1190 may arbitrate between occupants based on the priority. For instance, the occupant arbitrator 1190 may make a vehicle operation performance determination 1118 (e.g., may determine whether to perform the vehicle operation). For example, the occupant arbitrator 1190 may make the determination 1118 based on the classified data 1110 provided by the classifier 1186 and/or the occupant priority 1116 provided by the priority determiner 1188. In a case that the vehicle operation does not violate a preference of any higher-priority occupant, the occupant arbitrator 1190 may determine to perform the vehicle operation. In a case that the vehicle operation violates a preference of any higher-priority occupant, the occupant arbitrator 1190 may determine to not perform the vehicle operation.

In one example, a second occupant may trigger the vehicle operation determination. In this example, the second occupant does not have priority over a first occupant. Accordingly, the occupant arbitrator 1190 rejects performing the vehicle operation for the second occupant. This may occur, for example, because the first occupant has priority over the second occupant for the aspect of vehicle operation under consideration (and/or because performing the action may reduce comfort for the first occupant). Accordingly, the second occupant trigger (e.g., request) is rejected in this example. In some configurations, the occupant arbitrator 1190 may provide an indication of rejection. For example, the occupant arbitrator 1190 may indicate that an action is not being taken (on a display, with a verbal signal, etc.) for the second occupant. The indication may be provided for some cases (e.g., only cases where the occupant explicitly requests an action), for all cases (e.g., intentional and unintentional cases), or not at all.

In another example, a second occupant may trigger the vehicle operation determination. In this example, the second occupant has priority over a first occupant. Accordingly, the occupant arbitrator 1190 accepts performing the vehicle operation for the second occupant. This may occur, for example, because the second occupant has priority over the first occupant for the aspect of vehicle operation under consideration (and/or because performing the action may not impact (e.g., not significantly impact) comfort for the first occupant). Accordingly, the second occupant trigger (e.g., request) is accepted in this example. In some configurations, the occupant arbitrator 1190 may provide an indication of acceptance. For example, the occupant arbitrator 1190 may indicate that an action is being taken (on a display, with a verbal signal, etc.) for the second occupant. The indication may be provided for some cases (e.g., only cases where the occupant explicitly requests an action), for all cases (e.g., intentional and unintentional cases), or not at all.

Figure 12:
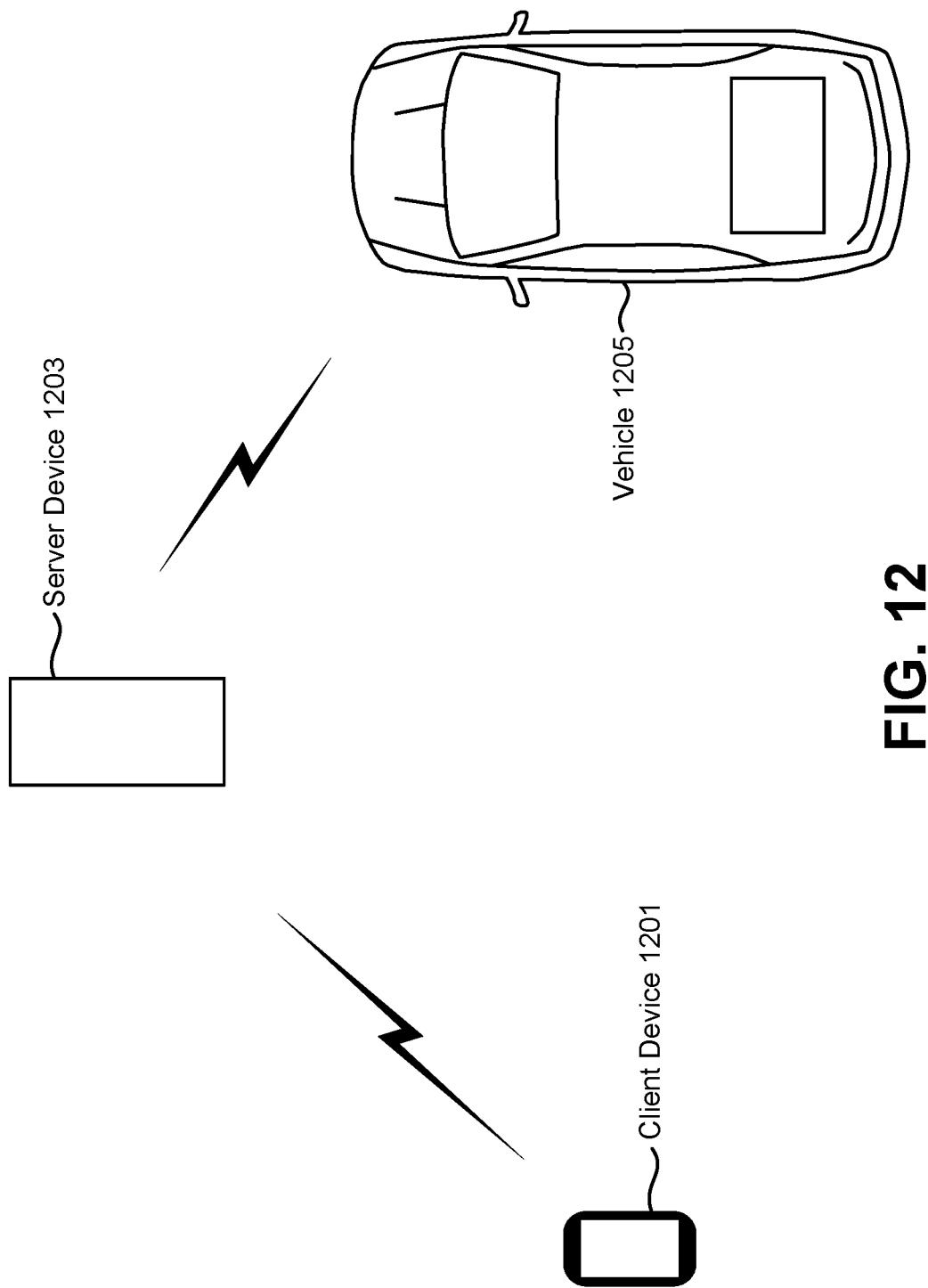
FIG. 12 is a diagram illustrating an example of a client device, a server device, and a vehicle.

FIG. 12 is a diagram illustrating an example of a client device 1201, a server device 1203, and a vehicle 1205. Some configurations of the systems and methods disclosed herein may be implemented in the client device 1201, the server device 1203, and/or the vehicle 1205. For example, the electronic device 102 described in connection with FIG. 1 may be implemented in the client device 1201, the server device 1203, or the vehicle 1205. Additionally or alternatively, one or more of the functions, operations, procedures, blocks, components, elements, etc., described in connection with one or more of FIGS. 1-11 may be distributed between the client device 1201, the server device 1203, and/or the vehicle 1205. The client device 1201, the server device 1203, and/or the vehicle 1205 may communicate directly (with one or more wired and/or wireless links) and/or may communicate via a network (e.g., wired and/or wirelessly with one or more intervening network devices (e.g., routers, switches, hubs, servers, gateways, access points, etc.). In some configurations, the vehicle 1205 may send information (e.g., a text message, email, phone call, alert, notification, streaming video, etc.) to the client device 1201 via a network (e.g., cloud).

It should be noted that one or more aspects described in connection with one configuration described herein may be combined with one or more aspects of one or more other configurations. For example, one or more aspects described in connection with one Figure may be combined with one or more aspects described in connection with another Figure.

Figure 13:
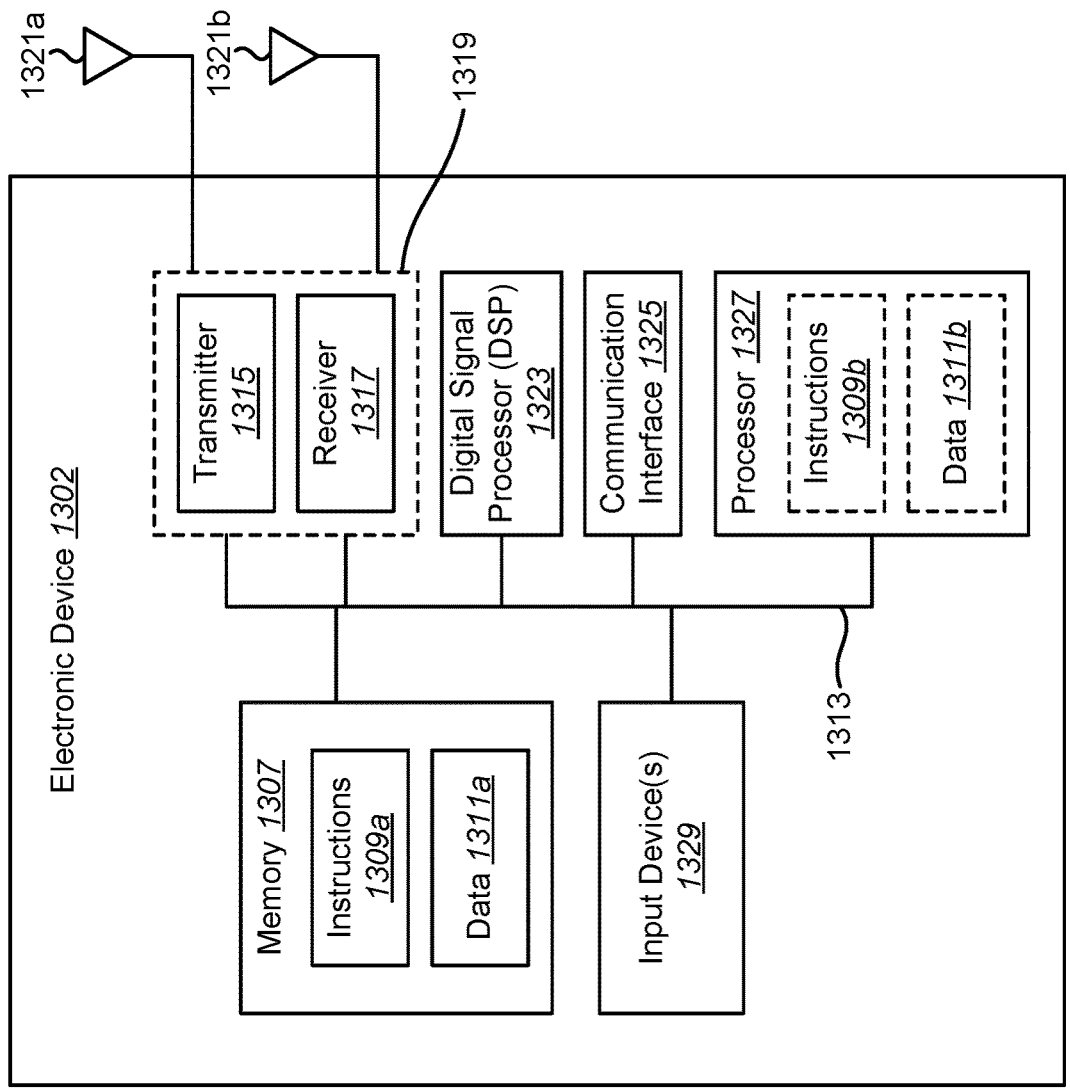
FIG. 13 illustrates certain components that may be included within an electronic device.

FIG. 13 illustrates certain components that may be included within an electronic device 1302. The electronic device 1302 may be an example of and/or may be implemented in accordance with the electronic device 102 described in connection with FIG. 1. The electronic device 1302 may be (or may be included within) a camera, video camcorder, digital camera, cellular phone, smart phone, computer (e.g., desktop computer, laptop computer, etc.), tablet device, media player, television, vehicle, automobile, surveillance camera, mounted camera, connected camera, robot, aircraft, drone, unmanned aerial vehicle (UAV), healthcare equipment, gaming console, personal digital assistant (PDA), set-top box, etc. The electronic device 1302 includes a processor 1327. The processor 1327 may be a general purpose single- or multi-chip microprocessor (e.g., an ARM), a special purpose microprocessor (e.g., a digital signal processor (DSP), image signal processor (ISP), etc.), a microcontroller, hardwired and/or programmable accelerators (including machine learning acceleration, for example), a programmable gate array, etc. The processor 1327 may be referred to as a central processing unit (CPU). Although just a single processor 1327 is shown in the electronic device 1302, in an alternative configuration, a combination of processors (e.g., an ARM and DSP) could be used.

The electronic device 1302 also includes memory 1307. The memory 1307 may be any electronic component capable of storing electronic information. The memory 1307 may be embodied as random access memory (RAM), read-only memory (ROM), magnetic disk storage media, optical storage media, flash memory devices in RAM, synchronous dynamic random-access memory (SDRAM), on-board memory included with the processor, EPROM memory, EEPROM memory, registers, and so forth, including combinations thereof.

Data 1311a and instructions 1309a may be stored in the memory 1307. The instructions 1309a may be executable by the processor 1327 to implement one or more of the methods described herein. Executing the instructions 1309a may involve the use of the data 1311a that is stored in the memory 1307. When the processor 1327 executes the instructions 1309, various portions of the instructions 1309b may be loaded onto the processor 1327, and various pieces of data 1311b may be loaded onto the processor 1327.

The electronic device 1302 may also include a transmitter 1315 and a receiver 1317 to allow transmission and reception of signals to and from the electronic device 1302. The transmitter 1315 and receiver 1317 may be collectively referred to as a transceiver 1319. One or multiple antennas 1321a-b may be electrically coupled to the transceiver 1319. The electronic device 1302 may also include (not shown) multiple transmitters, multiple receivers, multiple transceivers and/or additional antennas.

The electronic device 1302 may include a digital signal processor (DSP) 1323. The electronic device 1302 may also include a communication interface 1325. The communication interface 1325 may enable one or more kinds of input and/or output. For example, the communication interface 1325 may include one or more ports and/or communication devices for linking other devices to the electronic device 1302. In some configurations, the communication interface 1325 may include the transmitter 1315 and/or the receiver 1317 (e.g., the transceiver 1319). Additionally or alternatively, the communication interface 1325 may include one or more other interfaces (e.g., touchscreen, keypad, keyboard, microphone, camera, etc.). For example, the communication interface 1325 may enable a user to interact with the electronic device 1302.

The electronic device 1302 may include one or more input devices 1329. Examples of input devices 1329 may include sensors (e.g., image sensor(s), camera(s), microphone(s), lidar, radar, ultrasound sensor(s), weight sensor(s), health sensor(s), wireless signal sensor(s), etc.). Additionally or alternatively, the input device(s) may include touchscreen(s), knob(s), button(s), dial(s), mice, pointer(s), etc. The input device(s) 1329 may receive one or more inputs for the functioning of the electronic device 1302.

The various components of the electronic device 1302 may be coupled together by one or more buses, which may include a power bus, a control signal bus, a status signal bus, a data bus, etc. For the sake of clarity, the various buses are illustrated in FIG. 13 as a bus system 1313.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, hardwired and programmable co-processors, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed, or computed by the computing device or processor. As used herein, the term "code" may refer to software, instructions, code, or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium. In some configurations, over-the-air (OTA) updates over a cellular modem may be transmitted and/or received.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded, and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

As used herein, the term "and/or" should be interpreted to mean one or more items. For example, the phrase "A, B, and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B, and C" or the phrase "at least one of A, B, or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B, and C" or the phrase "one or more of A, B, or C" should be interpreted to mean any of: only A, only B, only C, A and B (but not C), B and C (but not A), A and C (but not B), or all of A, B, and C.

It is to be understood that the claims are not limited to the precise configuration and components illustrated above. Various modifications, changes, and variations may be made in the arrangement, operation, and details of the systems, methods, and apparatus described herein without departing from the scope of the claims.

What is claimed is:

1. A method performed by an electronic device, the method comprising:
    obtaining, by a processor, sensor data corresponding to multiple occupants from an interior of a vehicle, wherein the sensor data is stored in memory from one or more sensors;
    determining, by the processor, a priority of a first occupant of the vehicle based on the sensor data;
    determining, by the processor, a priority of a second occupant of the vehicle based on the sensor data;
    determining, by the processor, at least one vehicle operation triggered by the second occupant;
    determining, by the processor, that the priority of the second occupant is higher than the priority of the first occupant for the at least one vehicle operation;
    determining, by the processor, that the at least one vehicle operation does not violate at least one preference of the first occupant;
    in response to determining that the priority of the second occupant is higher than the priority of the first occupant and that the at least one vehicle operation does not violate the at least one preference of the first occupant, performing the at least one vehicle operation; and
    outputting an indication of the at least one vehicle operation.

2. The method of claim 1, wherein the sensor data includes a first portion of the sensor data corresponding to the first occupant and a second portion of the sensor data corresponding to the second occupant.

3. The method of claim 2, wherein determining the priority of the first occupant and the priority of the second occupant comprises prioritizing the first occupant or the second occupant based on at least one of vehicle ownership or guest status.

4. The method of claim 2, wherein determining the priority of the first occupant and the priority of the second occupant is based at least on a difference between a first occupant status of the first occupant and a desired status of the first occupant.

5. The method of claim 1, further comprising:
    obtaining an occupant status of the second occupant, wherein the occupant status indicates a detected emotion of the second occupant;
    wherein the priority of the second occupant is based on the occupant status of the second occupant.

6. The method of claim 5, wherein obtaining the occupant status of the second occupant comprises:
    measuring an occupant state with machine learning;
    obtaining an occupant state command; and
    combining the measured occupant state and the obtained occupant state command to produce the occupant status of the second occupant.

7. The method of claim 5, wherein obtaining the occupant status of the second occupant includes determining at least one of a temperature comfort level, a riding anxiety level, a safety level, a health level, a possessions status, an activity, or a plan status of the second occupant.

8. The method of claim 1, further comprising fusing the sensor data from the interior of the vehicle with sensor data from an exterior of the vehicle.

9. The method of claim 6, wherein a detected emotion of the second occupant is discomfort, and wherein the sensor data from the exterior of the vehicle indicates a second vehicle driving in an adjacent lane, and wherein the at least one vehicle operation comprises a lane change.

10. The method of claim 1, further comprising determining the priority of the first occupant by determining an occupant status of the first occupant based on a preference threshold.

11. The method of claim 1, wherein the indication includes at least one of a displayed indication or an audio output.

12. The method of claim 1, wherein the indication is associated with a change in a state of the at least one vehicle operation.

13. The method of claim 12, wherein the change in the state of the at least one vehicle operation includes at least one of a lane adjustment of the vehicle, a change in speed of the vehicle, a change in a rate of acceleration of the vehicle, or a change in distance of the vehicle relative to an additional vehicle.

14. An electronic device, comprising:
    a memory; and
    a processor coupled to the memory, wherein the processor is configured to:
        obtain sensor data corresponding to multiple occupants from an interior of a vehicle, wherein the sensor data is stored in the memory from one or more sensors;
        determine a priority of a first occupant of the vehicle based on the sensor data;

determine a priority of a second occupant of the vehicle based on the sensor data;

determine at least one vehicle operation triggered by the second occupant;

determine that the priority of the second occupant is higher than the priority of the first occupant for the at least one vehicle operation;

determine that the at least one vehicle operation does not violate at least one preference of the first occupant;

based on a determination that the priority of the second occupant is higher than the priority of the first occupant and that the at least one vehicle operation does not violate the at least one preference of the first occupant, perform the at least one vehicle operation; and output an indication of the at least one vehicle operation.

15. The electronic device of claim 14, wherein the sensor data includes a first portion of the sensor data corresponding to the first occupant and a second portion of the sensor data corresponding to the second occupant.

16. The electronic device of claim 15, wherein, to determine the priority of the first occupant and the priority of the second occupant, the processor is configured to prioritize the first occupant or the second occupant based on at least one of vehicle ownership or guest status.

17. The electronic device of claim 15, wherein the processor is configured to determine the priority of the first occupant and the priority of the second occupant based at least on a difference between a first occupant status of the first occupant and a desired status of the first occupant.

18. The electronic device of claim 14, wherein the processor is configured to:

obtain an occupant status of the second occupant, wherein the occupant status indicates a detected emotion of the second occupant; and determine the priority of the second occupant based on the occupant status of the second occupant.

19. The electronic device of claim 18, wherein, to obtain the occupant status of the second occupant, the processor is configured to:

measure an occupant state with machine learning;

obtain an occupant state command; and combine the measured occupant state and the obtained occupant state command to produce the occupant status of the second occupant.

20. The electronic device of claim 18, wherein, to obtain the occupant status of the second occupant, the processor is configured to determine at least one of a temperature comfort level, a riding anxiety level, a safety level, a health level, a possessions status, an activity, or a plan status of the second occupant.

21. The electronic device of claim 14, where the processor is configured to fuse the sensor data from the interior of the vehicle with sensor data from an exterior of the vehicle.

22. The electronic device of claim 14, wherein the processor is configured to determine the priority of the first occupant based on an occupant status of the first occupant determined based on a preference threshold.

23. The device of claim 14, wherein the indication includes at least one of a displayed indication or an audio output.

24. The device of claim 14, wherein the indication is associated with a change in a state of the at least one vehicle operation.

25. The device of claim 24, wherein the change in the state of the at least one vehicle operation includes at least one of a lane adjustment of the vehicle, a change in speed of the vehicle, a change in a rate of acceleration of the vehicle, or a change in distance of the vehicle relative to an additional vehicle.

26. A non-transitory tangible computer-readable medium storing computer executable code, comprising:

code for causing an electronic device to obtain sensor data corresponding to multiple occupants from an interior of a vehicle, wherein the sensor data is stored in memory from one or more sensors;

code for causing the electronic device to determine a priority of a first occupant of the vehicle based on the sensor data;

code for causing the electronic device to determine a priority of a second occupant of the vehicle based on the sensor data;

code for causing the electronic device to determine at least one vehicle operation triggered by the second occupant;

code for causing the electronic device to determine that the priority of the second occupant is higher than the priority of the first occupant for the at least one vehicle operation;

code for causing the electronic device to determine that the at least one vehicle operation does not violate at least one preference of the first occupant;

code for causing the electronic device to perform, in response to determining that the priority of the second occupant is higher than the priority of the first occupant and that the at least one vehicle operation does not violate the at least one preference of the first occupant, the at least one vehicle operation; and code for causing the electronic device to output an indication of the at least one vehicle operation.

27. The computer-readable medium of claim 26, wherein the sensor data includes a first portion of the sensor data corresponding to the first occupant and a second portion of the sensor data corresponding to the second occupant.

28. The computer-readable medium of claim 26, further comprising code for causing the electronic device to fuse the sensor data from the interior of the vehicle with sensor data from an exterior of the vehicle.

29. An apparatus, comprising:

means for obtaining sensor data corresponding to multiple occupants from an interior of a vehicle, wherein the sensor data is stored in memory from one or more sensors;

means for determining a priority of a first occupant of the vehicle based on the sensor data;

means for determining a priority of a second occupant of the vehicle based on the sensor data;

means for determining at least one vehicle operation triggered by the second occupant;

means for determining that the priority of the second occupant is higher than the priority of the first occupant for the at least one vehicle operation;

means for determining that the at least one vehicle operation does not violate at least one preference of the first occupant;

means for performing, in response to determining that the priority of the second occupant is higher than the priority of the first occupant and that the at least one vehicle operation does not violate the at least one preference of the first occupant, the at least one vehicle operation; and means for outputting an indication of the at least one vehicle operation.

30. The apparatus of claim 29, further comprising means for fusing the sensor data from the interior of the vehicle with sensor data from an exterior of the vehicle.

\* \* \* \* \*